United States Patent
Ogura

(10) Patent No.: US 8,494,267 B2
(45) Date of Patent: Jul. 23, 2013

(54) IMAGE PROCESSING DEVICE, IMAGE PROCESSING METHOD, AND PROGRAM FOR NORMALIZING A HISTOGRAM

(75) Inventor: Sho Ogura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/313,548

(22) Filed: Dec. 7, 2011

(65) Prior Publication Data
US 2012/0155764 A1 Jun. 21, 2012

(30) Foreign Application Priority Data
Dec. 15, 2010 (JP) ................................. 2010-278897

(51) Int. Cl.
*G06K 9/34* (2006.01)
*G06K 9/00* (2006.01)
(52) U.S. Cl.
USPC ........................................................ 382/171
(58) Field of Classification Search
USPC ................. 382/164, 167, 168, 170–173, 190, 382/218–220, 224, 275; 358/509, 515, 518, 358/520, 522, 523; 345/426, 581, 613; 375/240.02, 240.12; 348/672, 687
See application file for complete search history.

(56) References Cited

U.S. PATENT DOCUMENTS

| | | | | |
|---|---|---|---|---|
| 5,359,369 A * | 10/1994 | Izawa et al. | .................... | 348/672 |
| 6,741,295 B2 * | 5/2004 | Nieuwenhuizen et al. | ... | 348/687 |
| 7,079,157 B2 * | 7/2006 | Deering | .......................... | 345/613 |
| 7,245,764 B2 * | 7/2007 | Nishizawa | ..................... | 382/168 |
| 2003/0034974 A1 * | 2/2003 | Welch et al. | ................... | 345/426 |
| 2003/0052890 A1 * | 3/2003 | Raskar et al. | .................. | 345/581 |
| 2008/0219564 A1 * | 9/2008 | Covell et al. | ................... | 382/224 |
| 2009/0297038 A1 * | 12/2009 | Ishikawa et al. | ............... | 382/209 |
| 2010/0208982 A1 * | 8/2010 | Shimamura et al. | ........... | 382/154 |
| 2011/0229030 A1 * | 9/2011 | Ogura | ............................ | 382/170 |
| 2012/0155764 A1 * | 6/2012 | Ogura | ............................ | 382/171 |

FOREIGN PATENT DOCUMENTS

| | | |
|---|---|---|
| JP | 3506934 | 12/2003 |
| JP | 2008-77517 | 4/2008 |

OTHER PUBLICATIONS

U.S. Appl. No. 13/565,201, filed Aug. 2, 2012, Ogura.

* cited by examiner

*Primary Examiner* — Amir Alavi
(74) *Attorney, Agent, or Firm* — Oblon, Spivak, McClelland, Maier & Neustadt, L.L.P.

(57) ABSTRACT

An image processing device includes an obtaining unit obtaining image data of images; a dividing unit dividing the obtained image into N blocks; a designation unit sequentially designating the M blocks among the N blocks as the blocks to be updated; a histogram generation unit generating histograms of the obtained image data; a histogram storage unit sequentially updating and storing the generated histogram; a change determination unit determining a change in the obtained image, on the basis of the degree of similarity between the histogram of the generated M blocks and the histogram of the M blocks in the past corresponding to the generated M blocks which are stored; a normalization determination unit determining whether or not to perform normalization of the histogram; and a normalization unit normalizing any one of the histogram of the generated M blocks and the histogram of the corresponding M blocks in the past.

8 Claims, 22 Drawing Sheets

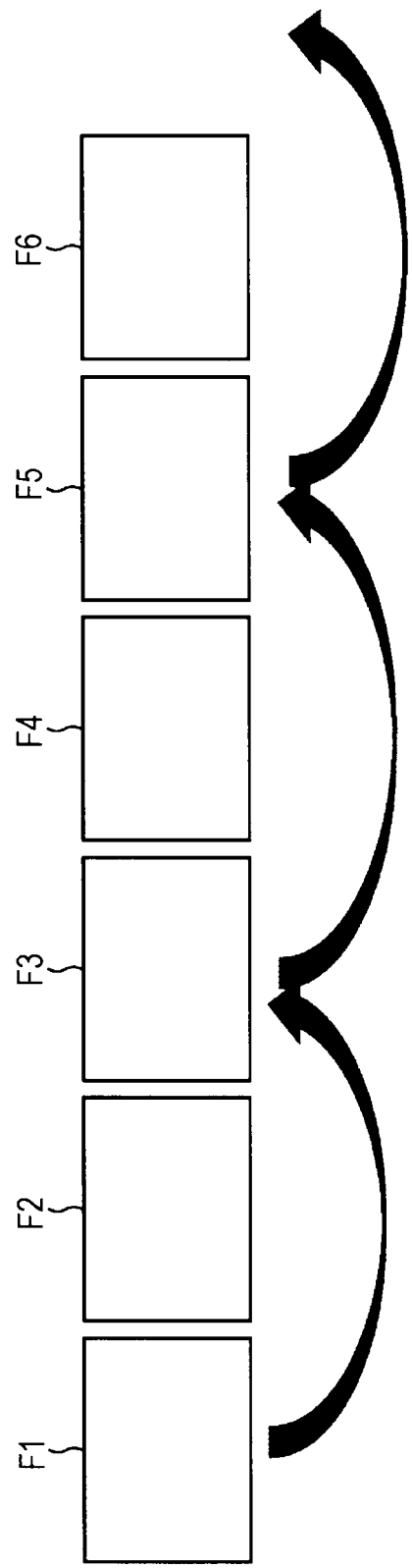

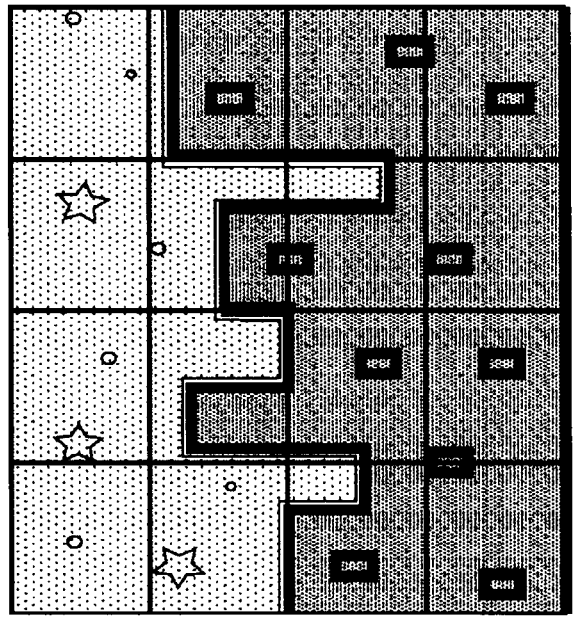
FIG. 3
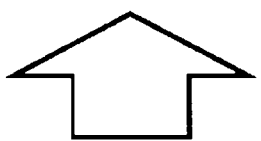
DIRECTION OF CAMERA IS CHANGED
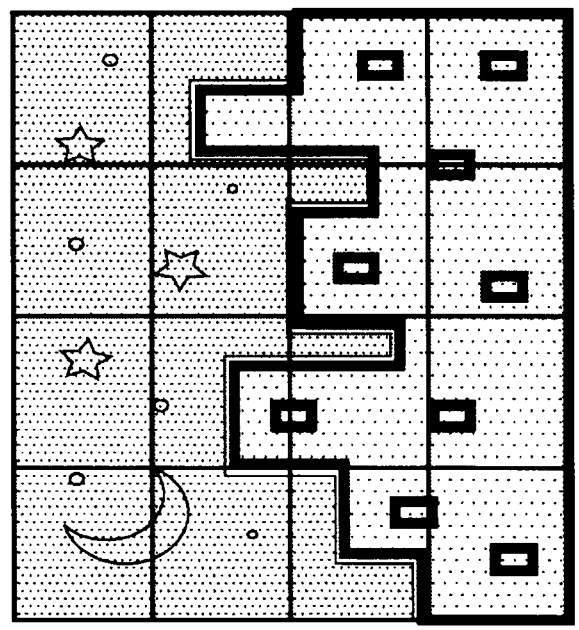

IMAGE PROCESSING DEVICE, IMAGE PROCESSING METHOD, AND PROGRAM FOR NORMALIZING A HISTOGRAM

BACKGROUND

The present disclosure relates to an image processing device, an image processing method, and a program, and specifically relates to an image processing device, an image processing method, and a program which can suppress a false detection and a detection omission of a hindrance due to normalization of an image.

In the related art, a surveillance system which photographs a space which is a target using a surveillance camera, and detects an intruder from a photographed image, is generally used, in order to detect an intruder such as a person, an animal, or the like. In the surveillance system, it may be difficult to perform the surveillance, when there is a hindrance, for example, covering the surveillance camera with cloth, changing the direction of the surveillance camera, spraying something onto a lens of the surveillance camera, or the like.

A technique is proposed, in which a difference in a luminance value between the current image which is taken using the surveillance camera and the reference image which is stored in advance, is calculated, and it is determined that there is a hindrance when the difference value is equal to or greater than the fixed value (for example, refer to Japanese Unexamined Patent Application Publication No. 2008-77517).

FIG. 1 is a diagram which describes updating of an image which is photographed using the surveillance camera. As shown in FIG. 1, for example, an image which is obtained in every other frame is stored as the reference image, and is sequentially updated, when frames F1 to F6 are sequentially obtained. That is, in this example, frames F1, F3, and F5 are sequentially updated as the reference images.

When there is no hindrance, a difference in luminance value is small, since a background image temporally before is the same as a background image temporally after. In contrast, when there is a change in the direction of the surveillance camera due to a hindrance, the difference in luminance value is large, since the background image temporally before is different from the background image temporally after.

For this reason, when frame F3 is obtained, a difference in luminance value between frame F3 and frame F1 as the reference image which is a past image at the time, is calculated. Similarly to this, when frame F5 is obtained, a difference in luminance value between frame F5 and frame F3 which is an image in the past, is calculated. It is determined that there is a hindrance when a large difference is obtained.

Meanwhile, there is a case where the entire brightness (a luminance value) of the captured image using the surveillance camera, changes due to a change in illumination or weather, or an AE (Automatic Exposure) of the surveillance camera. In order to prevent a false detection due to the change in the entire brightness (the luminance value), a technique is disclosed, in which the images are compared to each other, after normalizing a histogram of the luminance value of the images (see, for example, Japanese Patent No. 3506934)

SUMMARY

However, when the normalization is regularly performed with respect to the obtained image, there may be an adverse case where it is not possible to detect the hindrance due to the normalization.

FIGS. 2A and 2B show exemplary cases where it is possible to reduce the false detection of a hindrance due to the normalization.

FIG. 2A shows an example where a person wearing bright clothes intrudes into a space which is a detection target, and the entire brightness of the captured image is changed due to the AE function. In this example, the false detection of a hindrance occurs when the normalization is not performed. That is, if a current bright image is compared to an image with a dark background as the reference image, the surveillance system detects the change in the luminance value of the background, and recognizes it as a hindrance. Accordingly, it is possible to absorb the change in the luminance value of the background due to the AE function, and to prevent the false detection of a hindrance, by performing the normalization of the image.

FIG. 2B shows an example in which the illumination (the sunlight) has changed. In this example, the false detection of a hindrance occurs when the normalization is not performed, however, it is possible to prevent the false detection of a hindrance by performing the normalization, as well.

FIG. 3 shows an example where detection omission occurs due to the normalization, and an example where the image changes when a hindrance such as changing the direction of the surveillance camera, is performed.

In the images before and after the hindrance, the captured scenes (scenery) are the same, and the sky has the same brightness, however, the brightness of the building in the image after the hindrance (an image on the right side in FIG. 3), is darker than the brightness of the building in the image before the hindrance (an image on the left side in FIG. 3).

In this example, it is possible to detect the hindrance, since the change in brightness of the building is detected when the normalization is not performed. On the other hand, when the normalization is performed, there is a possibility of not detecting the hindrance, since the difference in brightness of the building is adjusted, accordingly there is no change. That is, there is a possibility of detection omission due to the normalization.

It is desirable to provide an image processing device which can suppress a false detection or detection omission of a hindrance due to normalization of an image.

According to an embodiment of the present disclosure, there is provided an image processing device which includes, an obtaining unit which obtains image data of an image; a dividing unit which divides the obtained image into N blocks (N>1); a designation unit which sequentially designates the M blocks (N≧M>1) among the N blocks as the blocks to be updated, every time the image data of the image which is new is obtained; a histogram generation unit which generates a histogram of the designated M blocks of the image data; a histogram storage unit which sequentially updates and stores the generated histogram; a change determination unit which determines a change in the obtained image, on the basis of the degree of similarity between the histogram of the generated M blocks and the histogram of the M blocks in the past corresponding to the generated M blocks which are stored; a normalization determination unit which determines whether or not to perform normalization of the histogram; and a normalization unit which normalizes any one of the histogram of the generated M blocks and the histogram of the corresponding M blocks in the past which are stored, when the normalization is determined in the normalization determination unit, in which the change determination unit determines a change in the obtained image, on the basis of the degree of similarity using the histogram after the normalization, when the normalization of the histogram is performed using the normalization unit.

According to another embodiment of the disclosure, there is provided an image processing method which includes, obtaining image data of an image; dividing the obtained image into N blocks (N>1); sequentially designating the M blocks (N≧M>1) among the N blocks as the blocks to be updated, every time the image data of the image which is new is obtained; generating a histogram of the obtained image data;
sequentially updating and storing the generated histogram; determining a change in the obtained image, on the basis of the degree of similarity between the histogram of the generated M blocks and the histogram of the M blocks in the past corresponding to the generated M blocks which are stored; determining normalization which determines whether or not to perform normalization of the histogram; normalizing any one of the histogram of the generated M blocks or the histogram of the corresponding M blocks in the past which are stored, when the normalization is determined in the normalization determination unit, in which the determining of the change determines the change in the obtained image, on the basis of the degree of similarity using the histogram after the normalization, when the normalization of the histogram is performed using the normalizing.

According to still another embodiment of the disclosure, there is provided a program which allows a computer to perform processes of, obtaining image data of an image; dividing the obtained image into N blocks (N>1); sequentially designating the M blocks (N≧M>1) among the N blocks as the blocks to be updated, every time the image data of the image which is new is obtained; generating a histogram of the obtained image data; sequentially updating and storing the generated histogram; determining a change in the obtained image, on the basis of the degree of similarity between the histogram of the generated M blocks and the histogram of the M blocks in the past corresponding to the generated M blocks which are stored; determining normalization which determines whether or not to perform normalization of the histogram; normalizing any one of the histogram of the generated M blocks and the histogram of the corresponding M blocks in the past which are stored, when the normalization is determined in the normalization determination unit, in which determining of the change determines a change in the obtained image, on the basis of the degree of similarity using the histogram after the normalization, when the normalization of the histogram is performed using the normalization processing.

According to the embodiment of the disclosure, image data of an image is obtained, the obtained image is divided into N blocks (N>1), and M blocks (N≧M>1) are sequentially designated as the blocks to be updated, among N blocks, whenever new image data is obtained. A histogram of the image data of the designated M is generated, and the generated histogram is sequentially updated and stored. In addition, a change in the obtained image is determined on the basis of the degree of similarity between the histogram of the generated M blocks and the histogram of the M blocks in the past corresponding to the generated M blocks which are stored, a determination on whether or not to perform normalization of the histogram is made, and normalization of any one of the histogram of the generated M blocks, and the histogram of the corresponding M blocks in the past which are stored, is performed. When the normalization is performed, a change in the obtained image is determined, on the basis of the degree of similarity using the histogram after the normalization.

In addition, the program may be provided by transmitting through a transmission medium, or by recording in a recording medium.

The image processing device may be an independent apparatus, or an internal block which configures one apparatus.

According to an embodiment of the disclosure, it is possible to suppress false detection and detection omission of a hindrance due to the normalization of images.

BRIEF DESCRIPTION OF THE DRAWINGS

FIG. 1 is a diagram which describes updating of an image in the related art.

FIG. 3 is a diagram which describes a bad example of normalization.

DETAILED DESCRIPTION OF EMBODIMENTS

[Configuration of an Image Processing Device]

Figure 2A:
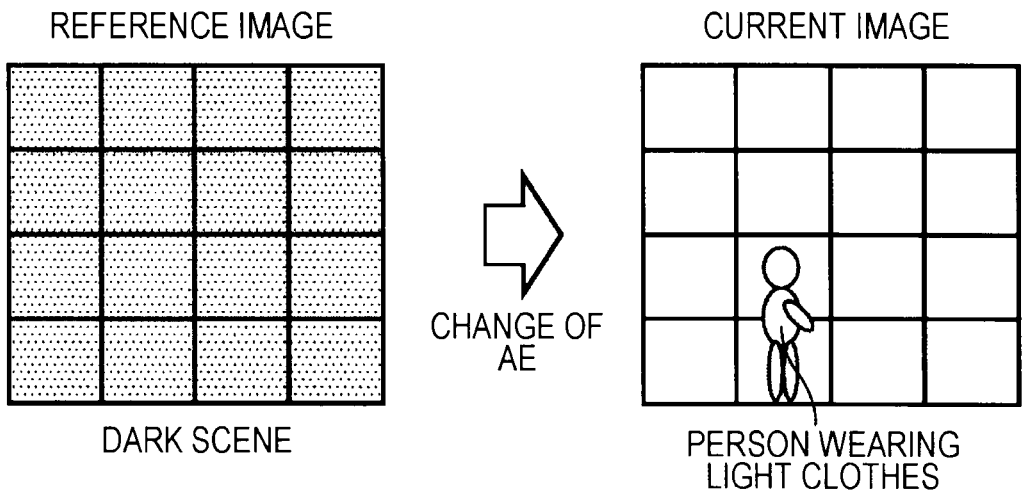
FIGS. 2A and 2B are diagrams which describe a good example of normalization.
Figure 2B:
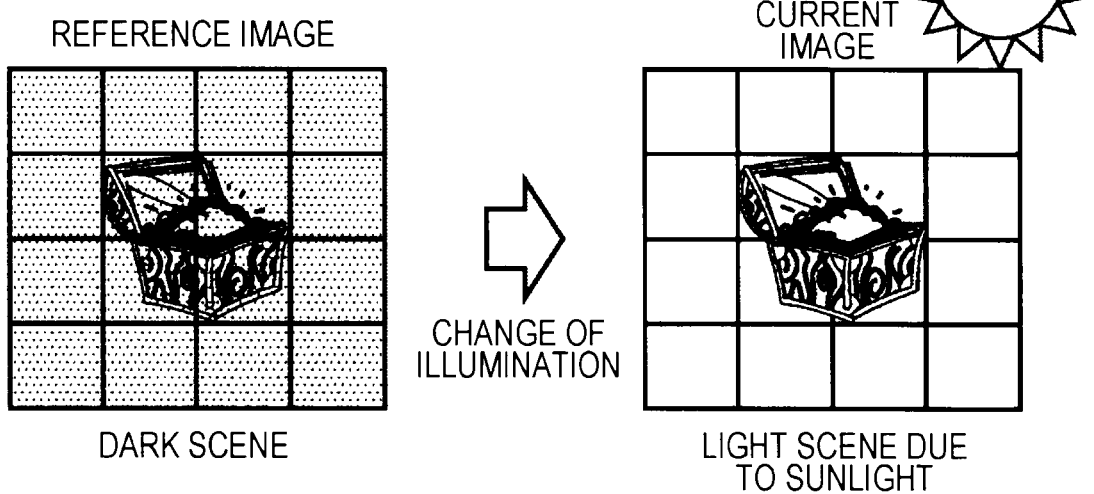
Figure 4:
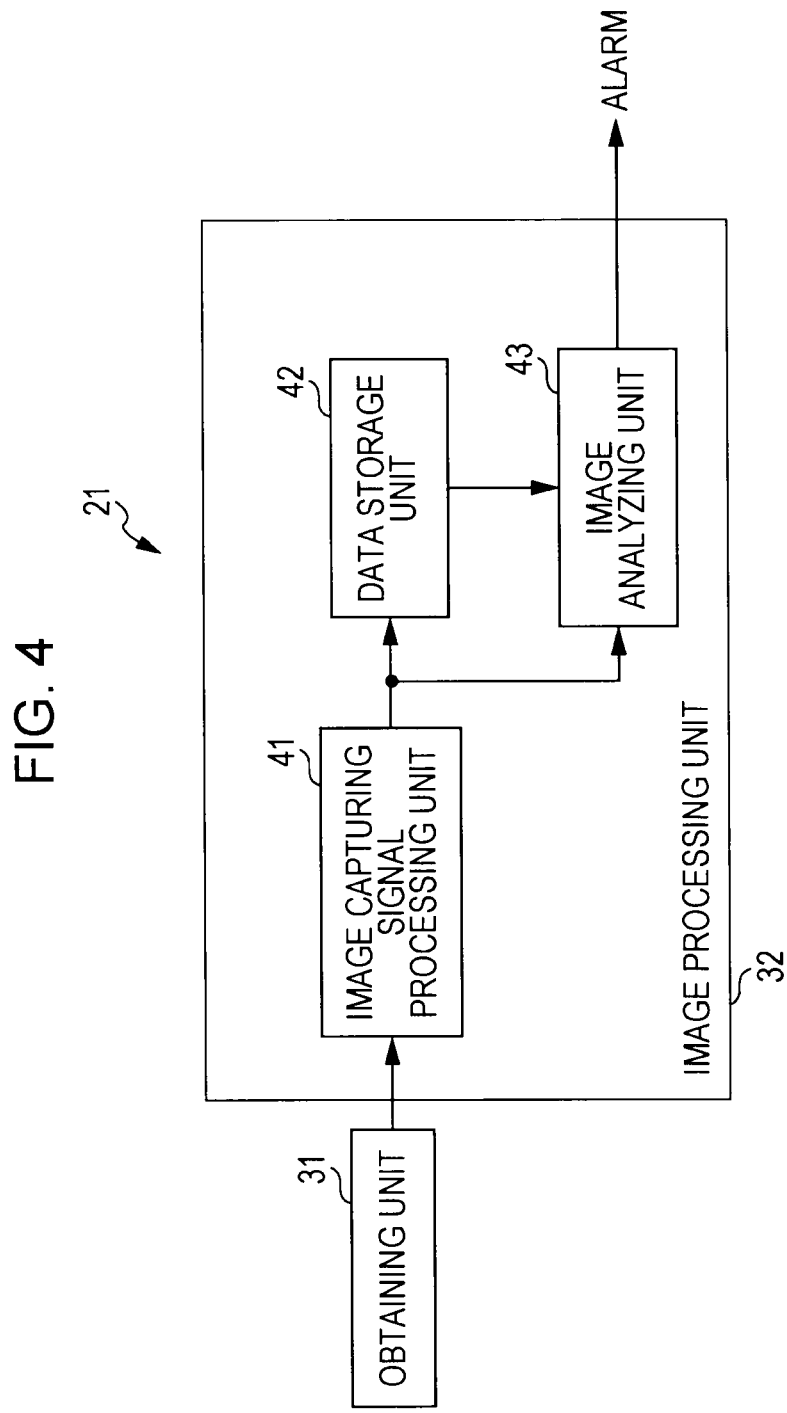
FIG. 4 is a block diagram which shows a configuration of an image processing device according to one embodiment of the present disclosure.

FIG. 4 is a block diagram which shows a configuration of an image processing device according to an embodiment of the present disclosure.

An image processing device 21 detects a hindrance with respect to a surveillance camera (a surveillance system), on the basis of obtained images, and output alarms when the hindrance is detected. An image processing device 21 includes an obtaining unit 31 and an image processing unit 32.

The obtaining unit 31 as an obtaining section which obtains image data of images accommodates an imaging unit such as a CMOS (Complementary Metal Oxide Semiconductor) sensor, a video camera, or the like in the inside, obtains image data which is obtained when the imaging unit photographs a subject such as a space to be observed, or the like, and outputs the image data. The obtaining unit 31 is also able to obtain image data which is supplied from the external device through a network.

The image processing unit 32 is configured by an imaging signal processing unit 41, a data storage unit 42, and an image analyzing unit 43.

The imaging signal processing unit 41 performs a variety of image processing such as black level correction processing, white balance processing, γ correction processing, color correction processing, or the like, with respect to image data which is obtained by the obtaining unit 31. The imaging signal processing unit 41 is configured by, for example, a DSP (Digital Signal Processor). The data storage unit 42 stores image data which is processed by the imaging signal processing unit 41. The data storage unit 42 is configured by, for example, a RAM (Random Access Memory). The image analyzing unit 43 detects the hindrance by analyzing a current image which is supplied by the imaging signal processing unit 41 and the reference image which is an image in the past which is supplied from the data storage unit 42. The image analyzing unit 43 is configured by, for example, a CPU (Central Processing Unit).

[Detection Hindrance Principle]

A principle (an outline) of detecting a hindrance which is performed by the image processing unit 21, will be described with reference to FIG. 5. According to an embodiment of the disclosure, an image PI in the past and a current image NI are input to a change area detection unit 51. The change area detection unit 51 divides the respective image PI in the past and current image NI into blocks with a predetermined size. In addition, a histogram of a pixel value is calculated for each block. The degree of similarity between a histogram of the blocks at a predetermined position of the image PI in the past and a histogram of the blocks at a position which correspond to the current image NI, is calculated. The blocks with a low degree of similarity are detected as a change area VI.

The hindrance determination unit 52 determines that there is a hindrance and outputs alarms, when the number of change areas Vi is large.

[Detailed Configuration of Image Analyzing Unit 43]

Figure 6:
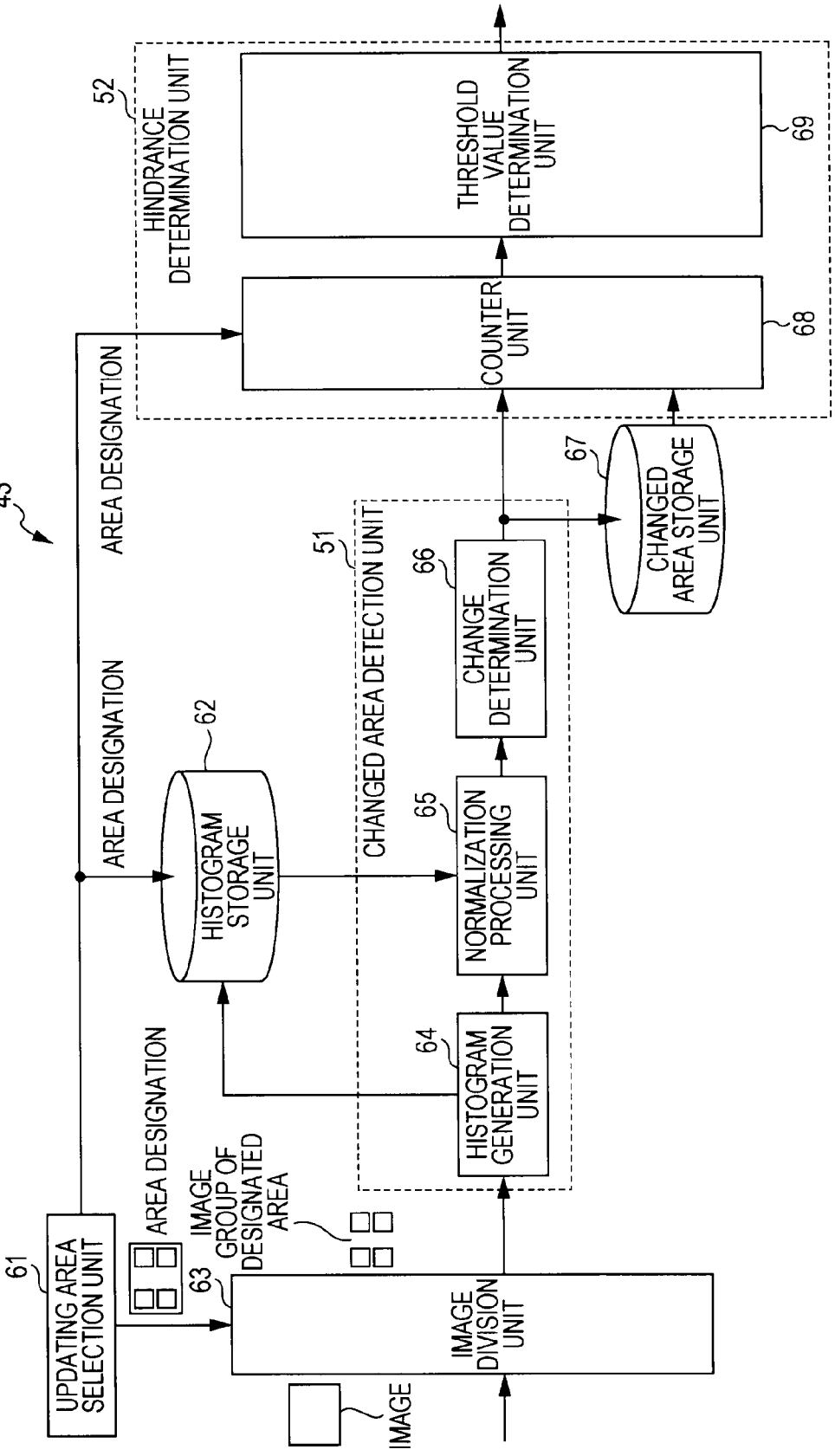
FIG. 6 is a block diagram which shows a detailed configuration example of an image analyzing unit.

FIG. 6 is a block diagram which shows a detailed configuration example of the image analyzing unit 43.

The image analyzing unit 43 is configured by an updating area selection unit 61, a histogram storage unit 62, an image dividing unit 63, a histogram generation unit 64, a normalization processing unit 65, a change determining unit 66, a change area storage unit 67, a counter unit 68, and a threshold value determining unit 69.

Figure 5:
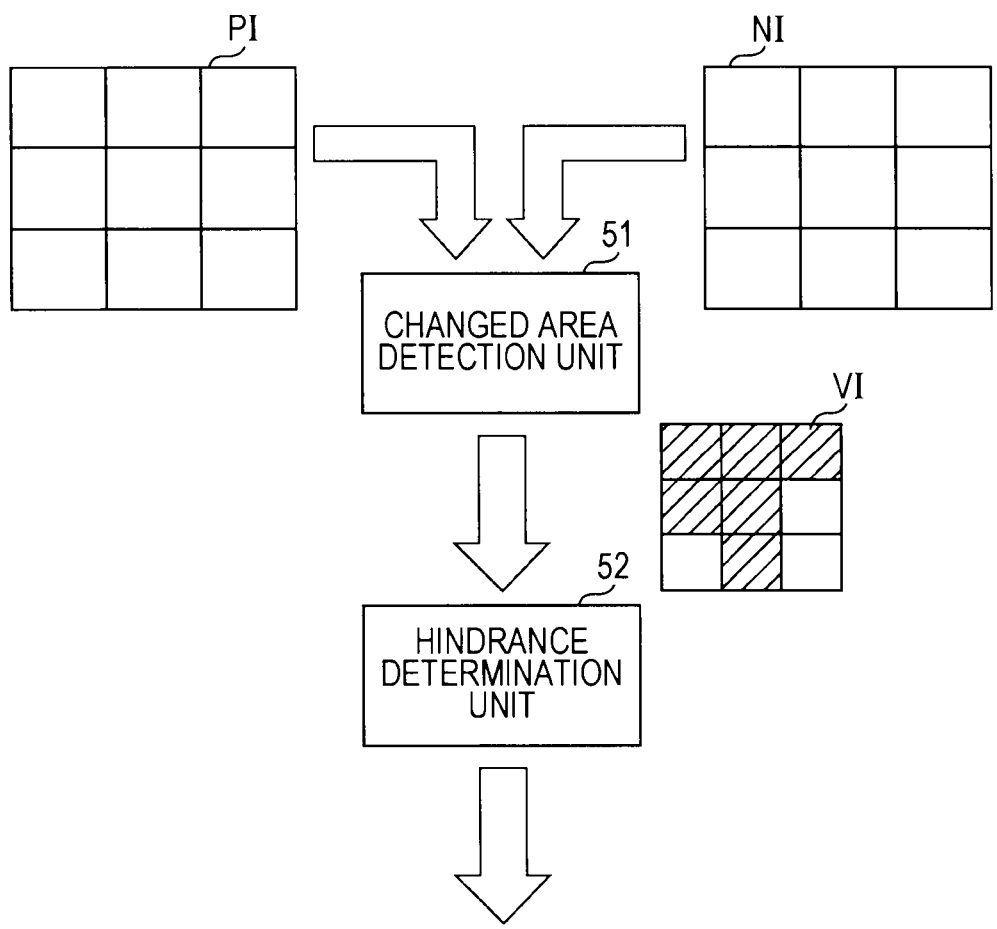
FIG. 5 is a diagram which describes a principle of detection of a hindrance.

In addition, the change area detection unit 51 shown in FIG. 5 corresponds to the histogram generation unit 64, the normalization processing unit 65, and the change determining unit 66 in FIG. 6. In addition, the hindrance determining unit 52 shown in FIG. 5 corresponds to the counter unit 60 and the threshold value determining unit 69 shown in FIG. 6. Further, the histogram storage unit 62 shown in FIG. 6 corresponds to the data storage unit 42 shown in FIG. 4. A part of the entire configuration shown in FIG. 6 may be provided in the imaging signal processing unit 41, or the data storage unit 42 shown in FIG. 4, not in the image analyzing unit 43.

The updating area selection unit 61 functions as a designation unit which sequentially designates M blocks (N≧M>1) among the N blocks as the blocks to be updated, every time the image data of the image which is new is obtained. The updating area selection unit 61 extracts a frame number of an image which is obtained by the obtaining unit 31 from the data which is supplied from the imaging signal processing unit 41, and determines the frame number to be updated. In addition, the updating area selection unit 61 determines the blocks to be updated among the frames to be updated.

The image dividing unit 63 as a dividing section which divides the obtained image into N blocks (N>1), divides a frame which is designated by the updating area selection unit 61 into a plurality of blocks, among images of each frame which are based on image data supplied from the imaging signal processing unit 41. In addition, the image dividing unit 63 supplies image data of the blocks which is designated by the updating area selection unit 61 to the histogram generation unit 64, among the divided blocks.

The histogram generation unit 64 as a histogram generation section which generates a histogram of the obtained image data, generates a histogram of the blocks which is supplied from the image dividing unit 63. In addition, there may be a case where the imaging signal processing unit 41 has a histogram generation function. In such a case, the histogram generation unit 64 can be provided inside the imaging signal processing unit 41.

The histogram storage unit which functions as a histogram storage section which sequentially updates and stores the generated histogram, updates a histogram of the blocks which are designated as an area to be updated by the updating area selection unit 61. That is, a histogram of the blocks to which frames in the past stored in advance correspond, can be rewritten by a histogram of the blocks of the current frame, which are to be updated, supplied from the histogram generation unit 64.

The normalization processing unit 65 normalizes a histogram of the blocks as necessary. A histogram of the blocks of the current frame, which are to be updated is supplied to the normalization processing unit 65 from the histogram generation unit 64. In addition, to the normalization processing unit 65, a histogram in the past which corresponds to the blocks supplied from the histogram generation unit 64, is supplied from the histogram storage unit 62. The normalization processing unit 65 determines whether or not it is necessary to perform normalization to each block which is an updating target of the current frame supplied from the histogram generation unit 64, and performs normalization, as necessary. In addition, whether the histogram of the blocks in the current frame, which are to be updated, is to be normalized, or the histogram of the blocks in the past frame which responds to the histogram in the current frame, is determined according to the situation of the histogram.

The change determination unit 66 as a change determination section which determines a change in the obtained image performs change determining processing, on the basis of the degree of similarity between the generated current histogram and the stored past histogram. That is, the change determination unit 66 determines the change in the image on the basis of a histogram of the blocks of the current frame, which are to be updated, supplied from the histogram generation unit 64, and a histogram of the blocks which correspond to the frame in the past supplied from the histogram storage unit 62. The current histogram and past histogram of the blocks to be updated which are supplied from the normalization processing unit 65, become a histogram after the normalization, when they are normalized in the normalization processing unit 65.

The change region storage unit 67 stores a determination result which is determined by the change determination unit 66. That is, the existence or non-existence of a change of the blocks of the current frame, which are to be updated with respect to the past blocks, is sequentially stored in the change region storage unit 67, every time image data of a new image is obtained.

The counter unit 68 as a counting section which counts the number of blocks which are determined to have been changed, is supplied with a determination result (existence or non-existence of the change) of the blocks of the current frame, which are to be updated, from the change determination unit 66. In addition, a determination result of blocks of the current frame which are not the updating target, is supplied from the change area storage unit 67 to the counter unit 68. The counter unit 68 counts the number of blocks of which one image under surveillance is changed, on the basis of the output results from the change determination unit 66 and the change area storage unit 67.

The threshold value determination unit 69 as an alarm threshold value determining section which compares the counted value to an alarm threshold value, and outputs an alarm when the counted value is larger than the alarm threshold value, compares the number of blocks which are counted by the counter unit 68 to a predetermined threshold value which is preset. When the counted number of blocks are larger than the threshold value, it is determined that there is a hindrance, and outputs the detection signal. The detection signal may be, for example, an alarm.

[Detailed Configuration of Normalization Processing Unit 65]

Figure 7:
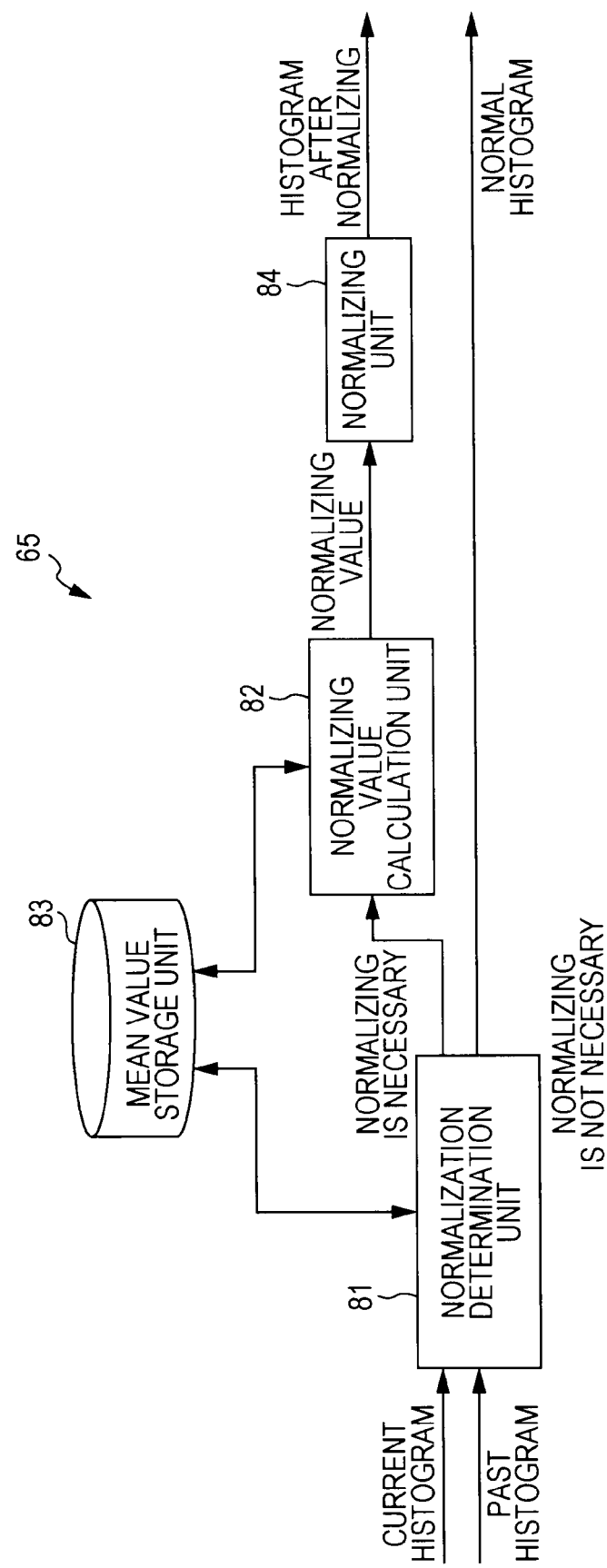
FIG. 7 is a block diagram which shows a detailed configuration example of a normalization processing unit.

FIG. 7 is a block diagram which shows a detailed configuration example of the normalization processing unit 65. The normalization processing unit 65 is configured by a normalization determining unit 81, a normalization value calculation unit 82, a mean value storage unit 83, and a normalization unit 84.

A histogram of the blocks of the current frame, which are to be updated, is supplied to the normalization determining unit 81 from the histogram generation unit 64, and the histogram in the past which corresponds to the blocks which are supplied from the histogram generation unit 64, is supplied from the histogram storage unit 62. Hereinafter, appropriately, the histogram of the blocks in the current frame, which are to be updated, is referred to as a current histogram, and the histogram of the blocks which correspond to the frame in the past is referred to as a past histogram.

The normalization determining unit 81 determines whether or not to perform normalization with respect to the blocks of the current frame, to be updated. When it is determined not to perform the normalization (not necessary to perform the normalization), the normalization determining unit 81 supplies the current and past histograms of each block to be updated which are input to the change determination unit 66 as are. When it is determined to perform the normalization (it is necessary to perform the normalization), the normalization determining unit 81 supplies the current and past histograms of each block to be updated which are input to the normalization value calculation unit 82.

The normalization value calculation unit 82 calculates a normalization value which is used when normalizing from the current and past histograms of each block to be updated which are input. The calculated normalization value is supplied to the normalization unit 84 along with the current and past histograms of each block to be updated which are input.

A direction of the change, changing rate, or the like of a mean value of the histogram of the blocks other than the blocks to be updated, which are calculated before the current frame, are stored in the mean value storage unit 83. In addition, the same value which is calculated in the normalization determining unit 81 and the normalization value calculation unit 82 with respect to the current frame, is also supplied to the mean value storage unit 83, and stored (updated) for the following processing of the subsequent frame. The details of a value which is stored in the mean value storage unit 83 (the direction of the change and changing rate of the mean value of the histogram), will be described later with reference to FIGS. 8 and 9.

The normalization unit 84 normalizes any one of the current histogram of each block to be updated, or the histogram in the past, on the basis of the normalized value which is calculated in the normalization value calculation unit 82. In this manner, it is possible to generate a histogram in which the brightness of the blocks are corrected using the current histogram and the histogram in the past. The normalization unit 84 outputs the current histogram and the histogram in the past after the normalization, to the change determination unit 66.

[Processing of Normalization Determining Unit 81]

Processing of the normalization determining unit 81 will be described with reference to FIG. 8.

The current and past histograms for each block to be updated, are supplied to the normalization determining unit 81. In the example shown in FIG. 8, the image is divided into sixteen blocks, and four blocks denoted by oblique lines show the blocks to be updated in the current frame.

The normalization determining unit 81 calculates respective mean values of the current histogram and the histogram in the past with respect to each block of the current frame, to be updated, and determines whether the direction of the change in the mean value from the past to the current frame is an increase, a decrease, or no change. For example, if a difference in the mean value (the absolute value) of the current and past histograms is in a predetermined range TH, it is determined as no change, and if the difference in the mean value (the absolute value) of the current and past histograms is larger than the predetermined range TH, it is determined as an increase or a decrease, according to the direction of the change.

In addition, the normalization determining unit 81 obtains a determination result (the direction of a change) which is determined similarly with respect to the blocks of the current frame, which are to be updated, from the mean value storage unit 83. Further, the normalization determining unit 81 determines any one of an increase, a decrease, or no change as the change of the entire screen. For example, if the number of blocks which increase (decrease) with respect to the number of blocks of the entire screen, is equal to or greater than the predetermined rate which is preset, then it is possible to be determined as a change of increasing (decreasing) in the entire screen.

Figure 8:
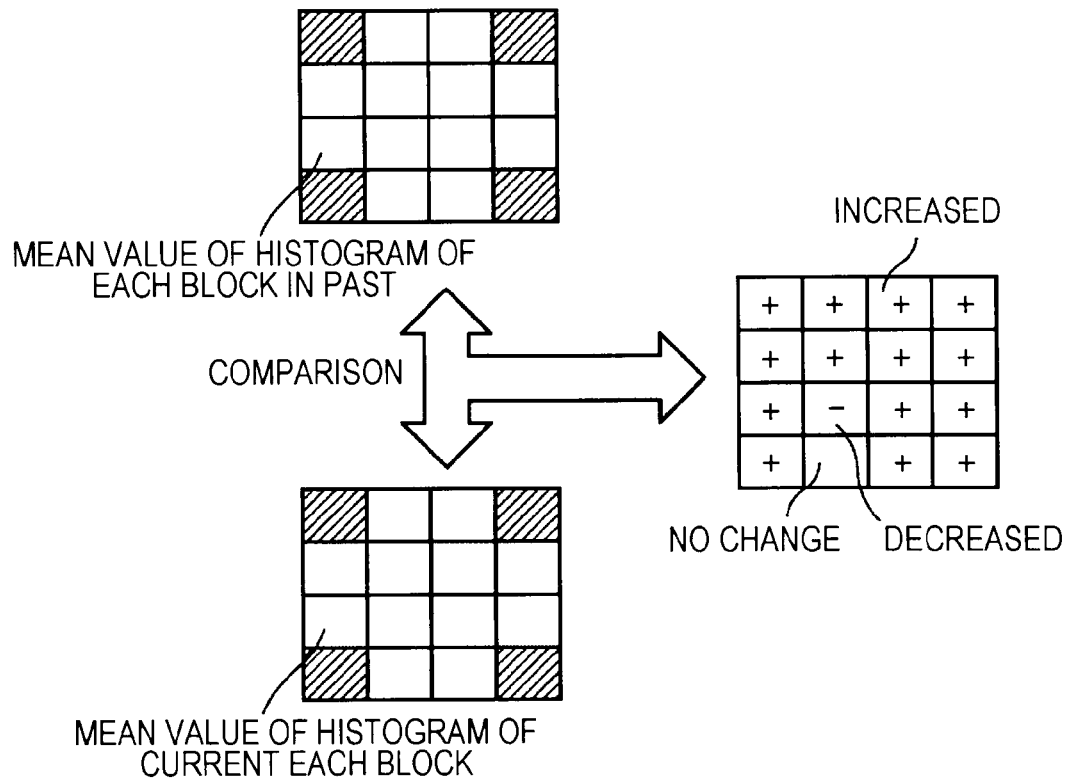
FIG. 8 is a diagram which describes processing of a normalization determining unit.

In the right diagram in FIG. 8, the blocks marked with plus signs denote the blocks of which direction of the change is the increase, and the block marked with a minus sign denotes the block of which direction of the change is the decrease. The block with no sign is a block with no change. The right diagram in FIG. 8 is determined to be a frame showing the change which increases in the entire screen.

When the direction of the change in the mean value of the histogram is inclined to any of the increase or the decrease over a certain range in the entire screen, it means that the entire screen becomes bright or dark. In this case, it is assumed to be a change in luminance in the entire screen due to the AE function or the illumination, or the hindrance such as covering the surveillance camera, or the like, therefore, it is better to perform the normalization. On the other hand, when there is no change in the mean value of the histogram in the entire screen, or when there is no inclination to an increase or decrease in the mean value, it is better not to perform the normalization. In such a case, there may be a case where it is assumed that a part of the screen, with no image change, is changed due to an intrusion of a moving body, or a hindrance such as covering the surveillance camera, or the like, is performed. Accordingly, normalization is performed, whereby the shape of the histogram matches in many areas. As a result, since a situation far from detecting the hindrance may occur, it is desirable to prevent this.

As described above, the normalization determining unit 81 determines that it is necessary to perform the normalization, when the direction of the change in the mean value of the histogram is inclined to any of an increase or decrease over a certain value, in the entire screen. On the other hand, the normalization determining unit determines that it is not necessary to perform the normalization, when there is no change in the mean value of the histogram in the entire screen, or when there is no inclination to an increase or decrease in the mean value.

[Processing of Normalization Value Calculation Unit 82]

The processing of the normalization value calculation unit 82 will be described with reference to FIG. 9.

The normalization value calculation unit 82 obtains a rate of change (hereinafter, referred to as a changing rate) which shows how much the direction of the change in the mean value of the histogram in the entire screen is changed in the entire screen, when the direction of the change in the mean value of the histogram is inclined to any of an increase or decrease, over a certain value, and sets the rate as the normalization value.

Firstly, the normalization value calculation unit 82 calculates respective mean values of the current histogram and the histogram in the past in each block. For each block of the current frame, to be updated, the mean value is calculated from the supplied histogram. The mean value of the current and past histograms of the block other than the block of the current frame, to be updated, is obtained from the mean value storage unit 83 in which the value is calculated in advance and stored.

Secondly, the normalization value calculation unit 82 determines an effective area from within the entire screen. Here, when it is determined that the direction of the change in the entire screen is an increase, in the normalization determining unit 81, the respective area of the blocks in which the direction of the change of the block is an increase, is set to the effective area. In addition, the normalization value calculation unit 82 divides the mean value of the current histogram by the mean value of the histogram in the past, for each block as the effective area, and sets the result as the changing rate. In this manner, it is possible to obtain the changing rate for each block as the effective area.

In addition, when the direction of the change in the entire screen is determined to be an increase, each area of the block of which direction of the change is an increase, is set to the effective area. However, the block of which the rate of increase is large to be equal to or greater than the predetermined value, in other words, the block which is extremely bright, is also excluded from the effective area. The block with no change, the block of which direction of the change in the mean value is a decrease, and the block which is extremely bright are excluded from the effective area, because there is a high possibility of a presence of a moving body which causes a change in the brightness in the block due to the AE function.

Figure 9:
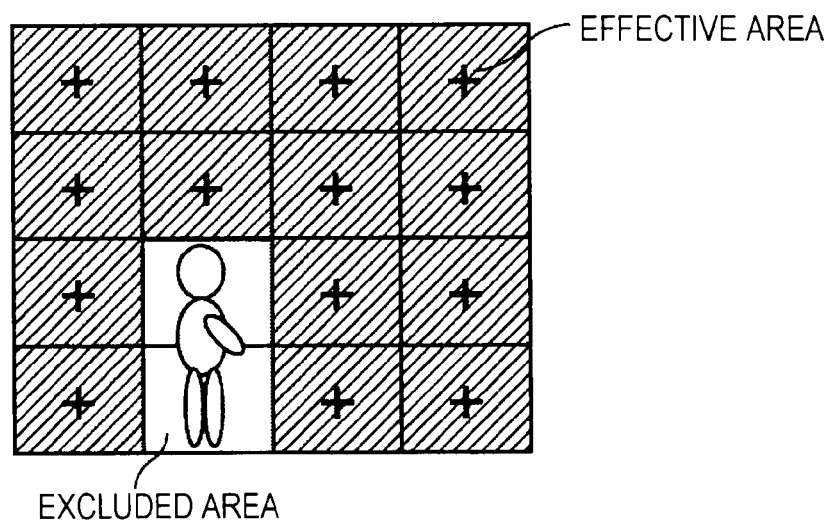
FIG. 9 is a diagram which describes processing of a normalization calculating unit.

FIG. 9 shows a block in which the block denoted by oblique line is an effective area.

In contrast, when the direction of the change of the entire screen is determined to be a decrease, in the normalization determining unit 81, each area of the block of which direction of the change is a decrease, is set to the effective area. In addition, the normalization value calculation unit 82 divides the mean value of the histogram in the past by the mean value of the current histogram, for each block which is the effective area, and sets the result as the changing rate. In this manner, it is possible to obtain the changing rate of each block as the effective area, when the direction of the change in the entire screen is determined to be a decrease.

Finally, the normalization value calculation unit 82 calculates the mean value of the changing rate which is obtained for each block as the effective area, is calculated, and the result is determined to be the normalization value.

As described above, since the changing rate of the entire screen in which the influence of the area where the moving body is present is excluded, is obtained and set as the normalized value, by determining the effective area and obtaining the mean value of the changing rate, it is possible to perform normalizing with high precision, in the normalization unit 84 at a latter stage.

[Processing of Normalization Unit 84]

The processing of the normalization unit 84 will be described with reference to FIGS. 10 and 11.

The normalization unit 84 performs stretching of the block of the current frame to be updated, between the current histogram and the histogram in the past, using the normalization value which is calculated in the normalization value calculation unit 82. When the direction of the change is an increase, that is, when it was determined that the entire screen becomes bright, the histogram in the past is stretched, and conversely, when it was determined that the entire screen becomes dark, the current histogram is stretched. That is, the dark histogram between the past histogram and the current histogram, is stretched.

FIG. 10 shows the current and past histograms of the block to be updated in the current frame. The horizontal axis denotes the luminance, and the vertical axis denotes the frequency (the number of pixels having a luminance value of a predetermined range).

Figure 10A:
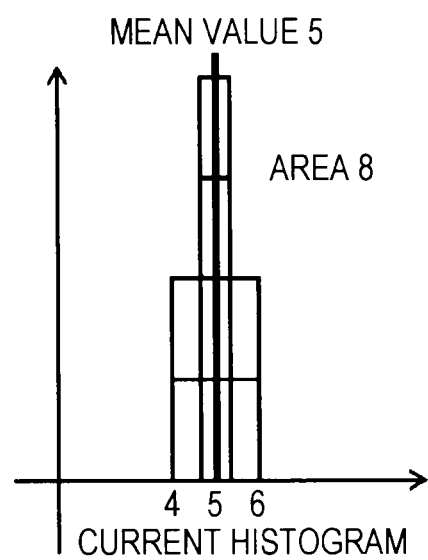
FIGS. 10A and 10B are diagrams which describe processing of a normalization unit.
Figure 10B:
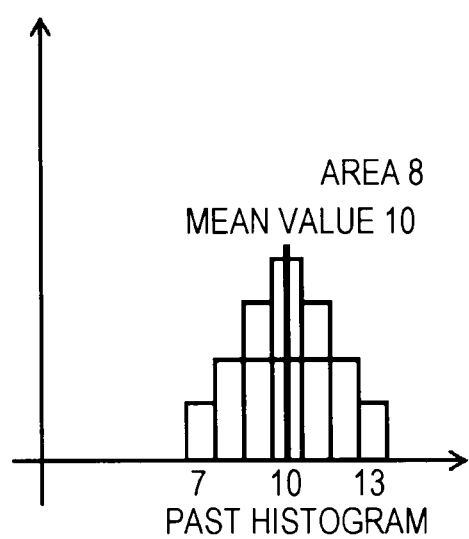

The current histogram shown in FIG. 10A has the mean value of 5, and the area of 8. On the other hand, the histogram in the past shown in FIG. 10B has the mean value of 10, and the area of 8. Such a relationship between the current histogram and the histogram in the past may be generated, for example, when the illumination (the sunlight) becomes dark in the same subject. If the presence or non-presence of the change is determined without performing the normalization, with respect to such a current histogram and histogram in the past, then it is determined that there is a change in the change determination unit 66 which determines the degree of similarity using the degree of overlapping of the histogram. However, if it is a change of the histogram due to only the illumination, the determination of the presence of the change is a false detection.

For this reason, the normalization unit 84 performs the stretching which stretches the current histogram using the normalization value calculated in the normalization value calculation unit 82. In detail, the normalization unit 84 stretches the current histogram in the horizontal axis direction (the direction of the luminance) using the normalization value.

Figure 11:
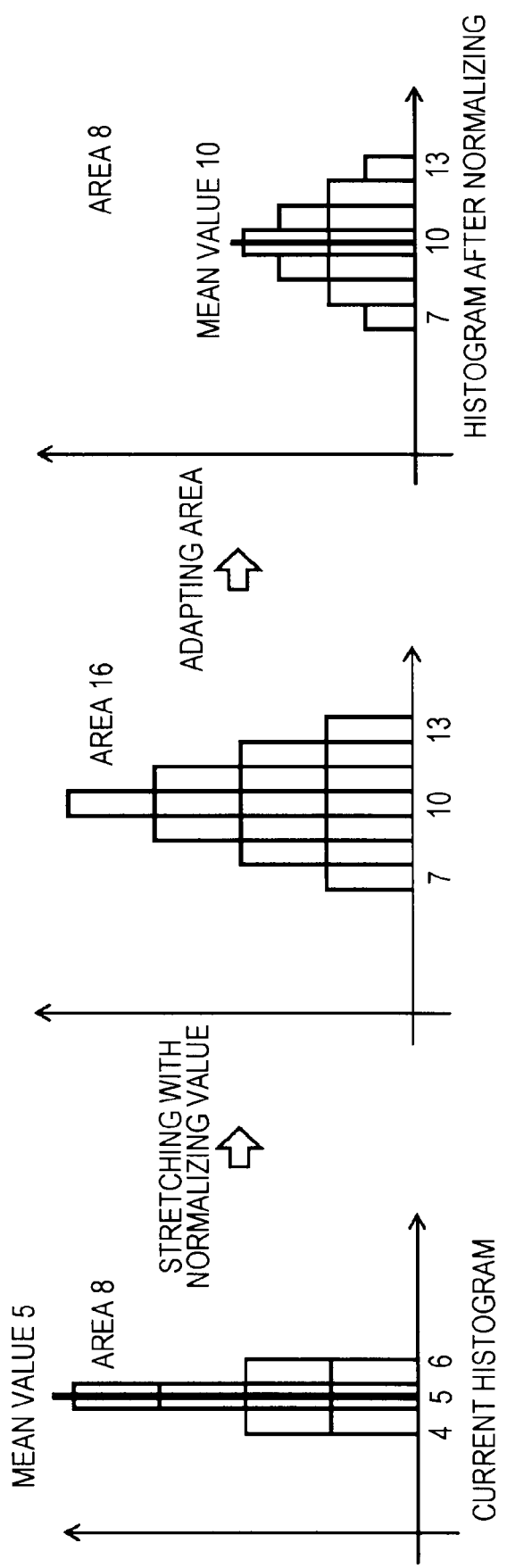
FIG. 11 is a diagram which describes processing of the normalization unit.

The example shown in FIG. 11 is an example of a case where the normalization value is "2". Since the luminance values before the stretching are only "4", "5", and "6", if they are doubled, they only become "8", "10" and "12", however, the frequency of the other luminance may be obtained by interpolating from the frequency at the periphery.

If the histogram is stretched, the area of the histogram is increased, therefore, subsequently the normalization unit 84 adjusts the degree of the histogram so that the areas become identical before and after the normalization. In the example shown in FIG. 11, since the area of the current histogram after the stretching is "16", and the area before the stretching is "8", the counts of each of the luminance values of the current histogram after the stretching becomes "8/16=½ times". In this manner, the area of the current histogram after the stretching becomes "8".

As described above, the current histogram and the histogram in the past are normalized according to the direction of the change in the entire screen. In addition, the histogram after the normalization is output to the change determination unit 66.

[Detailed Configuration of Change Determination Unit 66]

Figure 12:
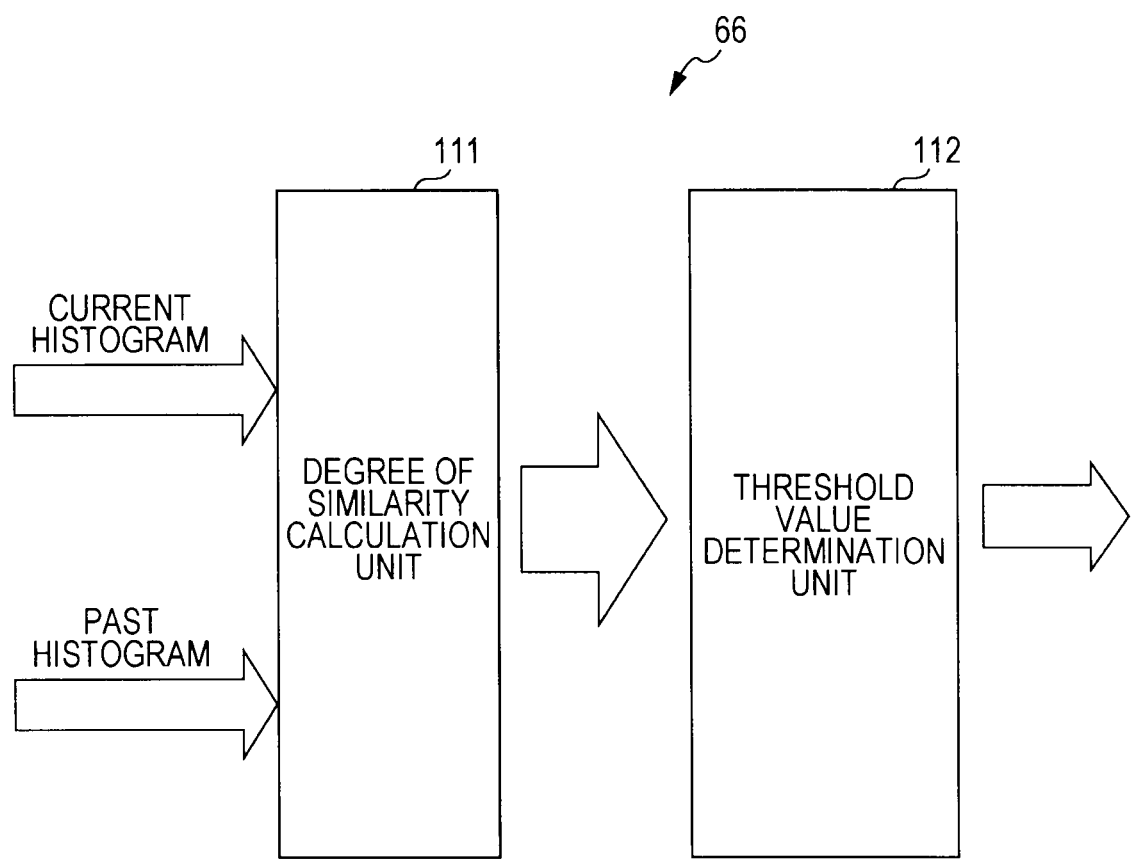
FIG. 12 is a block diagram which shows a detailed configuration example of a change determining unit.

FIG. 12 is a block diagram which shows a detailed configuration example of the change determination unit 66. The change determination unit 66 is configured by the degree of similarity calculation unit 111 and the threshold value determination unit 112.

The similarity calculation unit 111 functions as a section for calculating the degree of similarity which calculates the degree of similarity of the current histogram and the histogram in the past. That is, the similarity calculation unit 111 calculates the histogram of the blocks to be updated in the current frame and the histogram of the blocks in the past which corresponds to the current histogram.

The threshold value determination unit 112 as the degree of similarity threshold value determining section, compares the calculated degree of similarity and the degree of similarity threshold value. When the degree of similarity is larger than the degree of similarity threshold value, the threshold value determination unit determines that there is a change in the image of the block. The threshold value determination unit 112 outputs the determination result (the presence or non-presence of the change) on the change in the image of the block, to the change area storage unit 67 and the counter unit 68 (FIG. 6).

[Processing of Change Determination Unit 66]

The determination on the presence or non-presence of the change in the image of the block, which is performed by the change determination unit 66, will be described with reference to FIGS. 13 and 14.

Figure 13A:
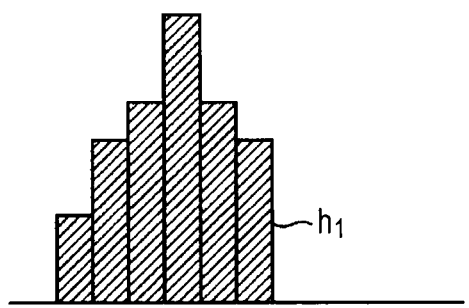
FIG. 13 is a diagram which describes processing of the change determining unit.
Figure 13B:
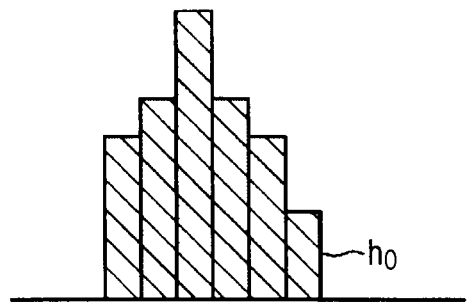

FIG. 13 shows an example of the current histogram and the histogram in the past which are supplied to the similarity calculation unit 111. That is, the histogram $h_1$ in FIG. 13A is an example of the current histogram, and the histogram $h_0$ in FIG. 13B is an example of the histogram in the past. In addition, the horizontal axis denotes a pixel value which is represented by the luminance value, and the vertical axis denotes the frequency (the number of pixels having the pixel value in a predetermined range).

In the similarity calculation unit 111, the degree of similarity is calculated using the following expression (1) in which an intersection is used, with respect to the histogram $h_1$ and the histogram $h_0$ as shown in FIG. 13.

$$D=\Sigma \min(A_i, B_i) \quad (1)$$

The $A_i$ and $B_i$ in the expression (1) respectively represent one pixel value of the current histogram $h_1$ and one pixel value of the histogram $h_0$ in the past. Therefore, according to the expression (1), the sum of the pixel value of which value is small, is obtained in each pixel value. The processing of this comparison is performed to the recent frame N(N>1).

Figure 14A:
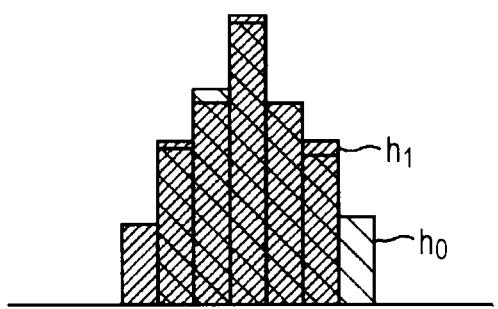
FIGS. 14A and 14B are diagrams which describe processing of the change determining unit.
Figure 14B:
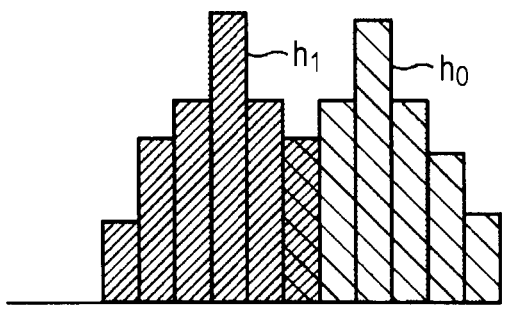

As shown in FIG. 14A, when almost all of the current histogram $h_1$ and the histogram in the past $h_0$ overlap each other, the value D which is calculated in expression (1) becomes large. In contrast, as shown in FIG. 14B, when the current histogram $h_1$ and the histogram in the past $h_0$ barely overlap each other, the value D becomes small. That is, the value D in expression (1) becomes large when the degree of similarity is high, and becomes small when the degree of similarity is low.

[Processing of Hindrance Detection]

Subsequently, the processing of the hindrance detection using the image processing device 21 will be described with reference to the flowchart in FIG. 15.

Firstly, the obtaining unit 31 obtains an image photographed using a camera in step S1. That is, the imaging unit captures a predetermined surveillance target, and obtains image data of the captured image.

In step S2, the image dividing unit 63 divides the image into N blocks. According to the embodiment of the disclosure, the image of each frame based on the image data is divided into 8×8 blocks.

In step S3, the updating area selection unit 61 selects an area to be updated (blocks to be updated). That is, a predetermined M (M≦N) blocks among the 8×8 blocks are selected as the blocks to be updated. The selection of the area to be updated will be described with reference to FIG. 16.

FIG. 16 is a diagram which describes a movement of blocks to be updated. According to the embodiment of the disclosure, M becomes 4, and the 8×8 blocks are divided into four groups which are formed of 4×4 blocks. In addition, one block is selected from each group, and a total of four blocks are selected as the blocks to be updated. In detail, as shown in FIG. 16A, the updating area selection unit 61 selects four blocks as the blocks to be updated, for example, the block b11 positioned on the leftmost side, the block b18 positioned on the rightmost side of the first row, and the block b81 positioned on the leftmost side, and the block b82 positioned on the rightmost side of the eighth row.

In addition, as shown in FIG. 16, a block which is positioned at the ith row from above, and at the jth column from the left, is denoted as bij. The same is to be applied in FIGS. 19 to 26.

Figure 16A:
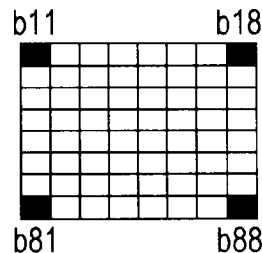
FIGS. 16A and 16F are diagrams which describe movement of blocks to be updated.
Figure 16B:
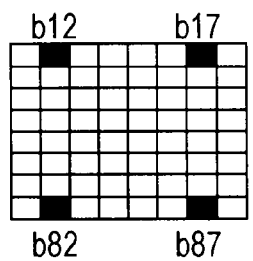

In the step of selecting a subsequent area to be updated, as shown in FIG. 16B, the updating area selection unit 61 selects four blocks as the blocks to be updated among the 8×8 blocks in the next frame, for example, the block b12 which is positioned on the immediately right side of the block b11 and the block b17 which is positioned on the immediately left side of the block b18 of the first row, the block b82 which is positioned on the immediately right side of the block b81 and the block b87 positioned on the immediately left side of the block b88 of the 8th row.

Figure 16C:
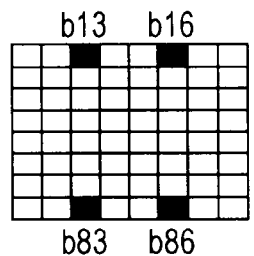

In the step of selecting a subsequent area to be updated, as shown in FIG. 16C, the updating area selection unit 61 selects four blocks as the blocks to be updated among the 8×8 blocks in the next frame, for example, the block b13 which is positioned on the immediately right side of the block b12 of the first row, and the block b16 which is positioned on the immediately left side of the block b17, the block b83 which is positioned on the immediately right side of the block b82 of the 8th row, and the block b86 positioned on the immediately left side of the block b87.

Figure 16D:
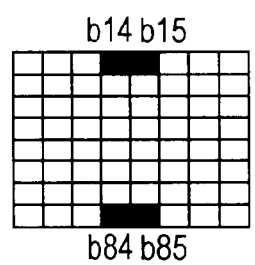

In the step of selecting a subsequent area to be updated, as shown in FIG. 16D, the updating area selection unit 61 selects four blocks as the blocks to be updated among the 8×8 blocks in the next frame, for example, the block b14 which is positioned on the immediately right side of the block b13 and the block b15 which is positioned on the immediately left side of the block b16 of the first row, the block b84 which is positioned on the immediately right side of the block b83 and the block b85 positioned on the immediately left side of the block b86 of the eighth row.

Figure 16E:
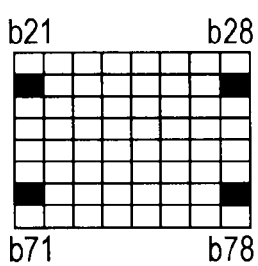

As described above, when the selection and the movement of the block in the uppermost row and the lowermost row, is ended, the second row and the seventh row is selected in the step of selecting a subsequent area to be updated. In addition, as shown in FIG. 16E, the updating area selection unit 61 selects four blocks as the blocks to be updated among the 8×8 blocks in the next frame, for example, the block b21 positioned on the leftmost side of the second row, and the block b28 positioned on the rightmost side of the second row, and the block b71 positioned on the leftmost side, and the block b78 positioned on the rightmost side of the seventh row.

Figure 16F:
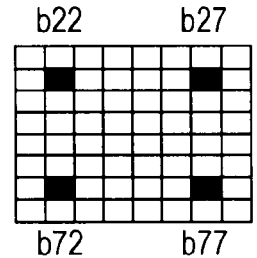

In the step of selecting a subsequent area to be updated, as shown in FIG. 16F, the updating area selection unit 61 selects four blocks as the blocks to be updated among the 8×8 blocks in the next frame, for example, the block b22 which is positioned on the immediately right side of the block b21 and the block b27 which is positioned on the immediately left side of the block b28 of the second row, the block b72 which is positioned on the immediately right side of the block b71 and the block b77 positioned on the immediately left side of the block b78 of the seventh row.

Hereinafter, according to the same order, four blocks as the blocks to be updated, are sequentially selected in one frame. That is, in the half area on the left side and the half area on the upper side, the blocks are selected from the left to the right in the row, and the rows are sequentially selected from the upper side to the lower side. In the half area on the right side and the half area on the upper side, the blocks are selected from the right to the left in the row, and the rows are sequentially selected from the upper side to the lower side. In the half area on the left side and the half area on the lower side, the blocks are selected from the left to the right in the row, and the rows are sequentially selected from the lower side to the upper side. In the half area on the right side and the half area on the lower side, the blocks are selected from the left to the right in the row, and the rows are sequentially selected from the lower side to the upper side.

Returning to FIG. 15, in step S4 the histogram generation unit 64 generates the histogram in the area to be updated.

In step S5, the histogram storage unit 62 stores the histogram which is generated in step S4. Since the histogram storage unit 62 stores the data in the past as the histogram, it is possible to make the storage capacity small, and realize a low cost, compared to a case where, the data in the past is stored as image data, for example, such as pixel values.

In step S6, the normalization processing unit 65 determines whether the normalization is necessary or not, on the basis of the histogram of the blocks to be updated in the current frame, and performs the normalization processing as necessary.

In step S7, the similarity calculation unit 111 calculates the degree of similarity between the current histogram and the histogram in the past which corresponds to the current histogram, with respect to each block to be updated of the current frame. In addition, when it is determined in step S6 that the normalization is performed, the degree of similarity is calculated using the histogram after the normalization.

In step S8, the threshold value determination unit 112 determines whether it is the changing area or not, with respect to each block to be updated of the current frame. That is, the degree of similarity D which is calculated in step S7, is compared with the predetermined threshold value Thd which is set in advance. When the degree of similarity D is smaller than the threshold value Thd, the block is determined as the area with the change. When even one frame of which the degree of similarity D is smaller than the threshold value Thd, is present among the recent N frames, the area is determined to have been changed.

In step S9, the change area storage unit 67 updates the determination result with respect to each block to be updated in the current frame. That is, the change area storage unit 67 stores the determination result (that is, the determination result by the number of blocks) by one frame for each block, and updates the earlier determination result using the determination result in step S8.

In step S10, the counter unit 68 counts the number of changing areas in the entire area. That is, the number of blocks as the changing areas are counted in the entire 64 blocks constituting the image frame which are surveillance target, on the basis of the determination result (the presence or non-presence of the change) of the blocks to be updated in the current frame, from the change determination unit 66, and the determination result of the blocks other than the blocks to be updated in the current frame, which are from the change area storage unit 67.

In step S11, the threshold value determination unit 69 determines whether the counted number of changing areas is larger than the threshold value or not. In detail, the number of blocks which are the counted changing areas in step S10, is compared to the predetermined threshold value Thc which is determined in advance.

In step S11, when the counted number of the changing areas is determined to be larger than the threshold value, the process proceeds to step S12, and the threshold value determination unit 69 outputs alarms or the like, which show that there is a hindrance.

On the other hand, in step S11, when the counted number of the changing areas is equal to or smaller than the threshold value, and after the processing in step S12, the hindrance detection process is ended.

The processing described above is performed for each frame.

[Detailed Normalizing Processing]

Figure 15:
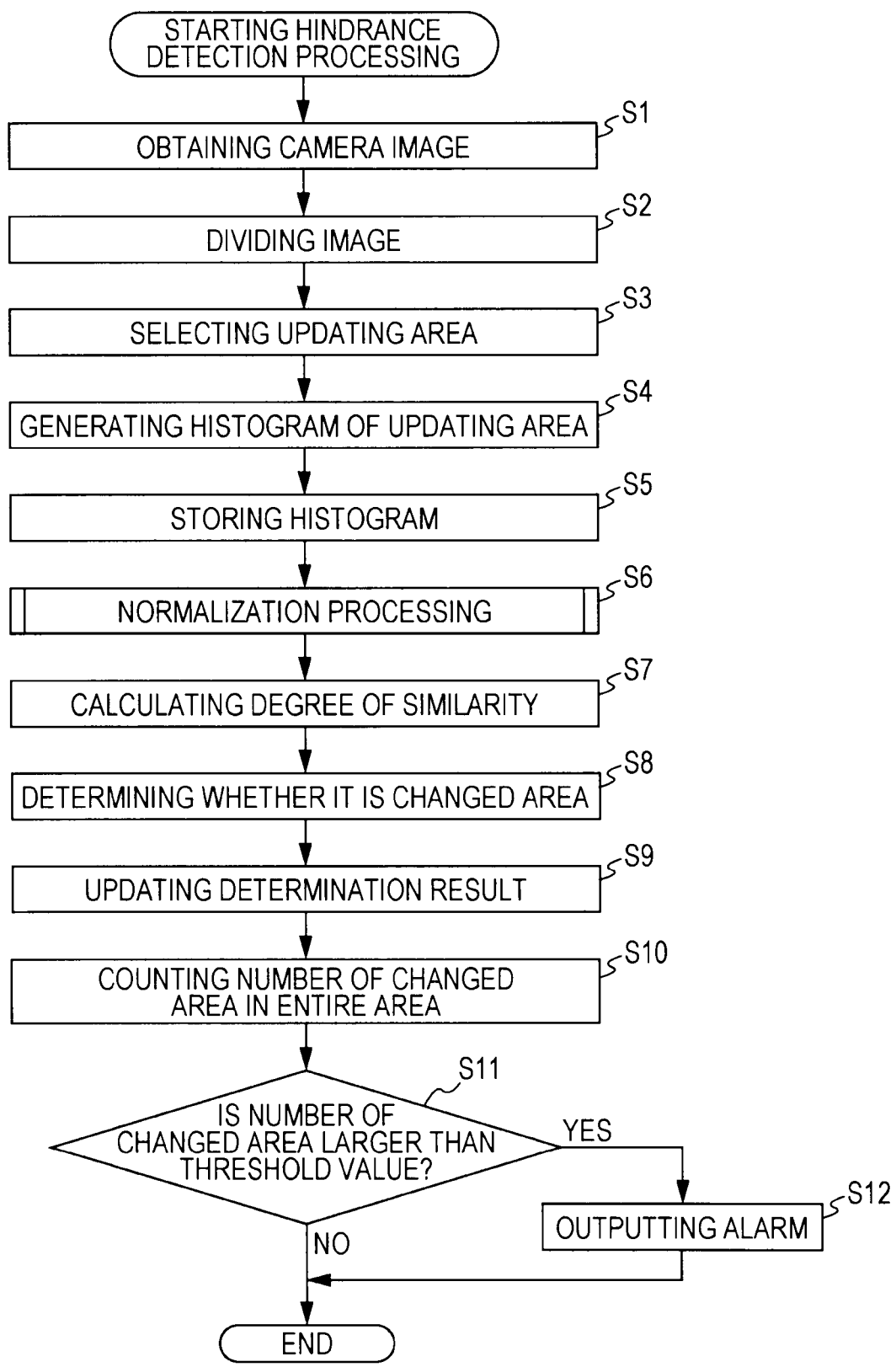
FIG. 15 is a flowchart which describes detection processing of a hindrance.
Figure 17:
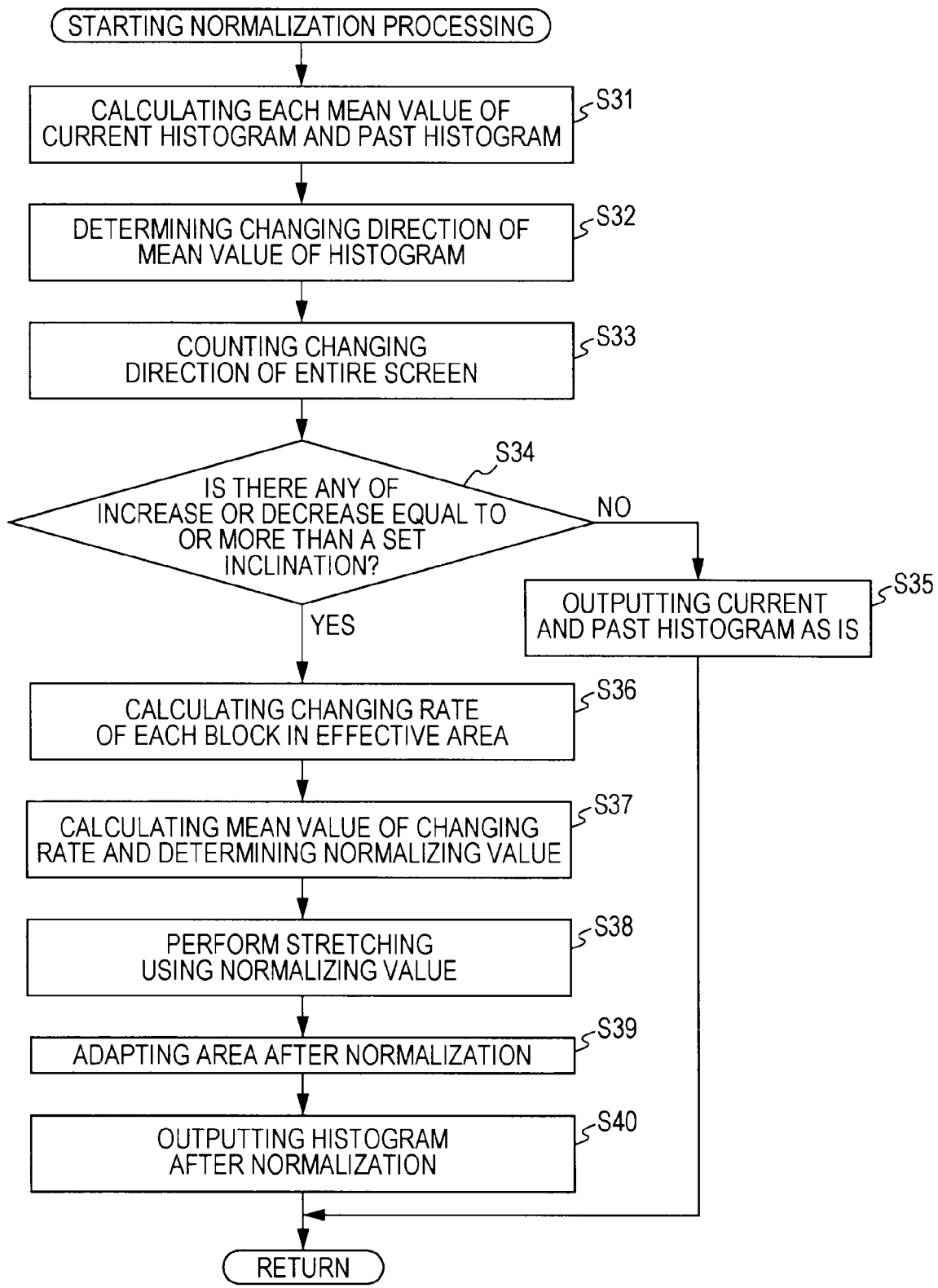
FIG. 17 is a flowchart which describes processing of the normalization in detail.

FIG. 17 is a detailed flowchart of the normalization processing which is performed as step S6 in FIG. 15.

In this processing, firstly in step S31, the normalization determining unit 81 calculates respective mean values of the current histogram and the histogram in the past, with respect to each block to be updated.

In step S32, the normalization determining unit 81 determines the direction of the change of the mean value of the histogram, with respect to each block to be updated. That is, the normalization determining unit 81 determines whether the direction of the change of the mean value of the histogram from the past to the present, is an increase, a decrease, or no change, with respect to each of the blocks to be updated.

In step S33, the normalization determining unit 81 counts the direction of the change in the entire screen. Specifically, the normalization determining unit 81 obtains the determination result which is obtained when similarly determining the blocks other than the blocks to be updated, from the mean value storage unit 83, and counts the respective number of blocks of an increase, a decrease, and no change, along with the determination result of each block to be updated.

In step S34, the normalization determining unit 81 determines that there is an inclination of over a certain range, in any of an increase and a decrease in the entire screen.

In step S34, when it is determined that there is an inclination of over a certain range, in any of an increase or a decrease, the processing proceeds to step S35, and the normalization determining unit 81 outputs the respective current histogram and the histogram in the past of each block to be updated, to the change determination unit 66 as is.

On the other hand, in step S34, when it is determined that there is an inclination of over a certain range, in any of an increase or a decrease, the processing proceeds to step S36, and the normalization determining unit 81 supplies the respective current histogram and the histogram in the past of the blocks to be updated, to the normalization value calculation unit 82. In addition, the normalization value calculation unit 82 calculates the changing rate of each block in the effective area in which the abnormal area is excluded from the entire screen. More specifically, the respective mean values of the current histogram and the histogram in the past are calculated with respect to each block to be updated. In addition, the respective mean values of the current histogram and the histogram in the past are obtained from the mean value storage unit 83, with respect to the blocks other than the blocks to be updated. In addition, the changing rate of each block in the effective area is obtained, by determining the effective area according to the direction of the change in the entire screen, and by dividing one of the mean value of the histogram in the past and the mean value of the current histogram, by the other mean value, with respect to each block as the effective area.

In step S37, the normalization value calculation unit 82 calculates the mean value of the changing rate which is obtained with respect to each block as the effective area, and determines the result as the normalization value.

In step S38, the normalization unit 84 performs the stretching which stretches the current histogram or the histogram in the past, using the normalization value which is calculated in step S37.

In step S39, the normalization unit 84 adjusts the area so as to be identical before and after the normalization, with respect to the stretched histogram. That is, the reciprocal of the area magnification before and after the stretching is multiplied to the frequency of each luminance value of the stretched histogram, thereby adjusting the area so as to be identical before and after the normalization.

In step S40, the normalization unit 84 outputs the histogram after the normalization to the change determination unit 66. That is, the normalization unit 84 outputs one of the current histogram and the histogram in the past which are normalized and the remaining one, to the change determination unit 66.

After the processing in step S40, or after the processing in step S35, the normalization processing is ended, and the processing returns to the hindrance detection processing in FIG. 15.

As described above, according to the normalization processing, the determination of whether to perform the normalization or not is made, and the normalization of the histogram is performed as necessary. In detail, the normalization of the histogram is performed, when there is an inclination of over a certain range in an increase or a decrease, to the direction of the change in the entire screen. In this manner, it is possible to suppress the false detection of a hindrance due to the AE function or a change in illumination. In addition, it is possible to suppress detection omission of the hindrance which occurs when the entire histogram is uniformly normalized. Further, when normalizing the histogram, it is possible to perform the normalization with high precision, by calculating the changing rate in which an area where the direction of the change is different from that of the entire screen is excluded, as the normalization value.

[Movement of Block]

Figure 18:
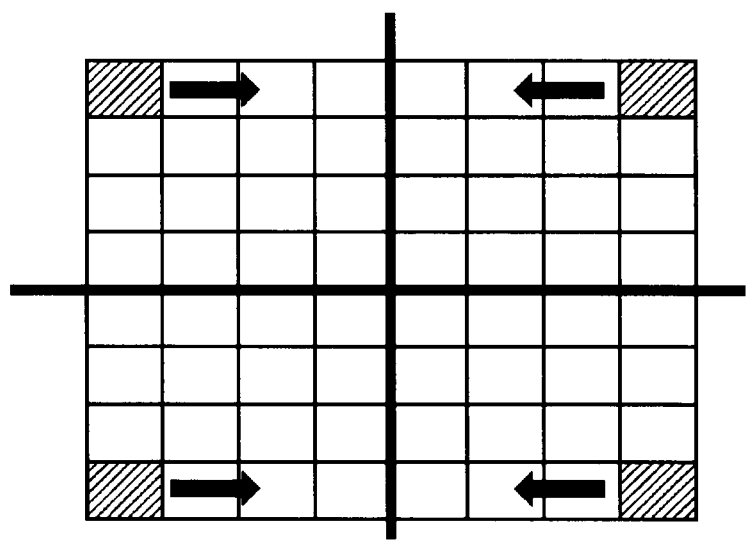
FIG. 18 is a diagram which describes movement of blocks to be updated.

FIG. 18 is a diagram which describes the movement of the block to be updated. As shown in the drawing, according to the embodiment of the disclosure, the block to be updated moves in two different directions, for example, the left direction and the right direction in the horizontal direction, for each frame. As a result, it is possible to detect the change in the horizontal direction sensitively. The detailed examples are shown in FIGS. 19 and 20.

Figure 19:
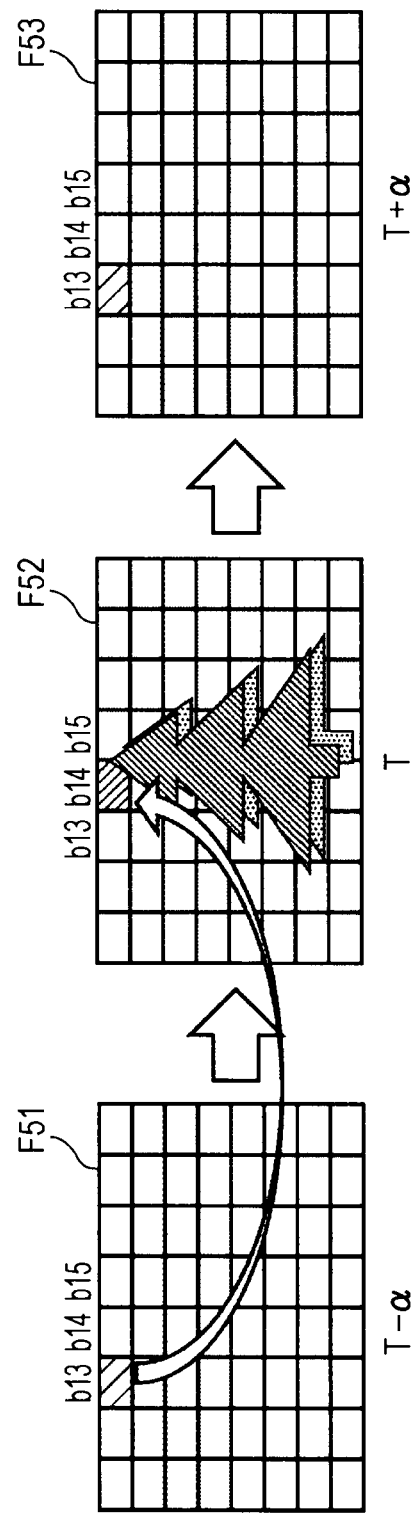
FIG. 19 is a diagram which describes an updating gap.

FIG. 19 is a diagram which describes the updating gap when there is a fast movement of the imaging unit due to a hindrance. Here, it is assumed that the direction of the imaging unit of the obtaining unit 31 is changed to the left at a high speed, due to the hindrance. In this case, the change of the image is as follows. That is, nothing is imaged from block b11 to block b88 of frame F51 on the left side in FIG. 19. Frame F52 after a time a from frame F51 is shown in the center of FIG. 19. In this frame, a part of a roadside tree is imaged over the blocks b14, b15, b24, b25, b34, b35, b43 to 46, b53 to b56, b63 to b66, b72 to b77, b84, and b85. Further, as shown on the right side in FIG. 19, the roadside tree is not imaged in any of the blocks b11 to b88, in frame F53 after the time α.

The updating gap between the blocks is short. For example, after the block b13 is updated in frame F51, the next block b14 on the right is updated in the next frame F52. Similarly, as shown in FIGS. 16C and 16D, the blocks b16, b83, and b86 are updated in frame F51, and then the blocks b15, b84, and b85 are updated in frame F52. When the blocks b14, b15, b84, and b85 are updated in frame F52, since frame F51 is also included in the image of N frames which is in the immediate vicinity. Accordingly, these blocks to be updated are detected as the changing area. Therefore, it is possible to detect the fast movement of the imaging unit due to a hindrance, from the change of the image of the blocks.

Figure 20:
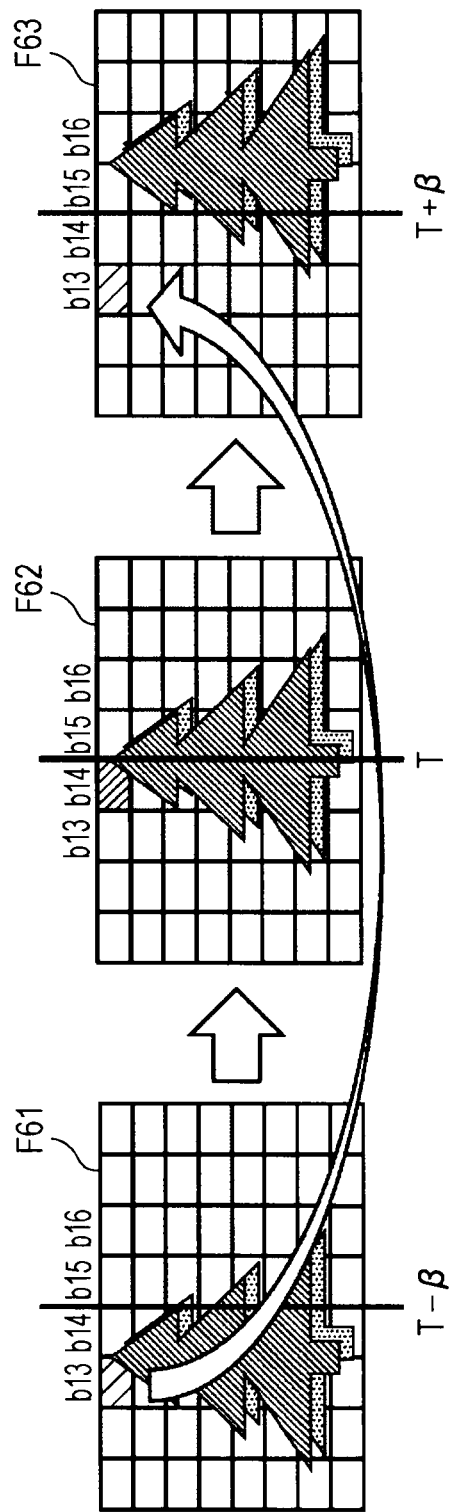
FIG. 20 is a diagram which describes the updating gap.

FIG. 20 is a diagram which describes the updating gap when the movement is slow. Here, it is assumed that the direction of the obtaining unit 31 is changed to the left at a low speed. Frames F61 to F63 for each time β in this case, are shown. In frame F61, a part of the roadside tree is imaged over the blocks b13, b14, b23, b24, b33, b34, b42 to b45, b52 to b55, b62 to b65, b71 to b76, b72 to b77, b83, and b84. In frame F62, a part of the roadside tree is imaged over the blocks b14, b15, b24, b25, b34, b35, b43 to b46, b53 to b56, b63 to b66, b72 to b77, b84, and b85. In frame F63, a part of the roadside tree is imaged over the blocks b15, b16, b25, b26, b35, b36, b44 to b47, b54 to b57, b64 to b67, b73 to b78, b85, and b86.

The updating gap is long in the same block. When 4 blocks are updated at a time in the 64 blocks, the same blocks are updated for 16 (=64/4) frames. For example, the block b13 which is updated in frame F61 is updated in frame F63 after 16 frames. Similarly, as shown in FIG. 16C, the blocks b16, b83, and b86 are updated. In frame F63, when the blocks b13, b16, b83, and b86 are updated, if frame F61 is also included in the image of the N frames in the immediate vicinity, these blocks to be updated are detected as the changing area. Accordingly, it is possible to detect the slow movement of the imaging unit due to a hindrance, from the change of the image of the blocks.

In this manner, it is necessary to make the gap for updating the block short, when detecting fast movement, and to make the gap for updating the same block long, when detecting fast movement. In addition, the number N of frames to be stored in the histogram storage unit 62, is set to a number from the frame in which the blocks at the same position are updated, to the frame in which the blocks immediately before is updated.

[Detection of Change of Image when Entire Image of Frame is Updated]

For reference, a case where the entire image of one frame is updated, not updating in a unit of block according to the embodiment, is described as follows.

Figure 21:
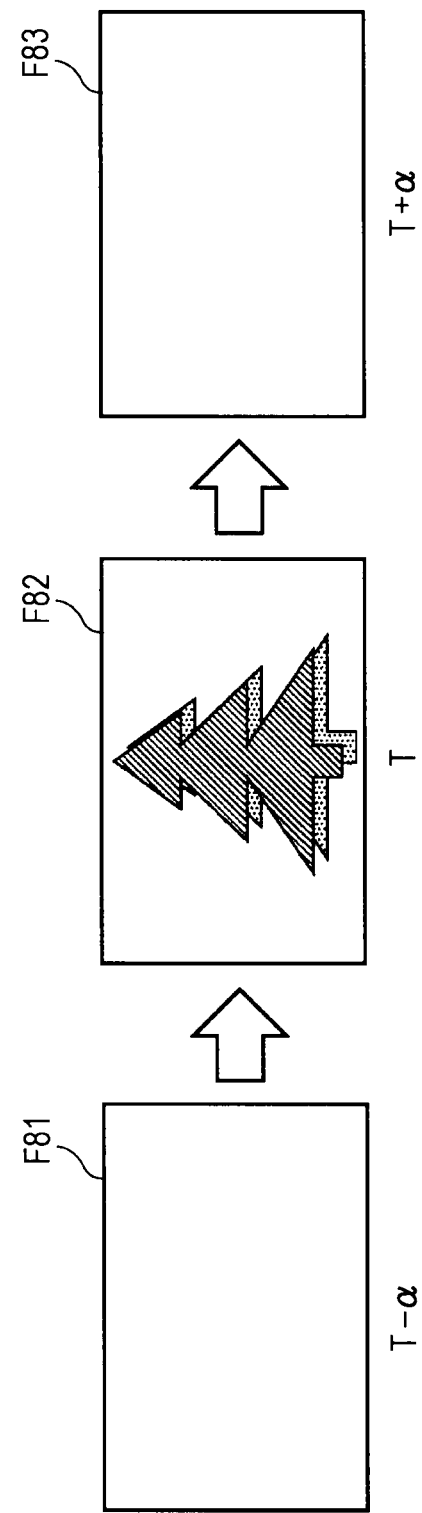
FIG. 21 is a diagram which describes the updating gap.
Figure 22:
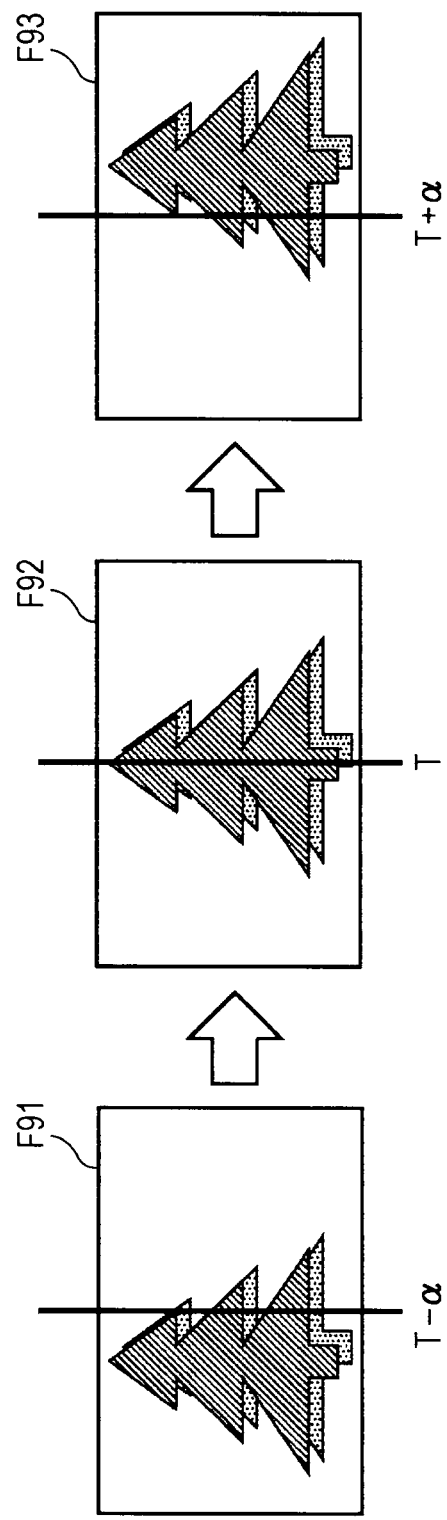
FIG. 22 is a diagram which describes the updating gap.

FIGS. 21 and 22 are diagrams which describe an updating gap of an image when the entire image of one frame is updated. FIG. 21 corresponds to FIG. 19, and FIG. 22 corresponds to FIG. 20.

FIG. 21 shows a change of an image when the direction of the imaging unit of the obtaining unit 31 is changed to the left at high speed, due to a hindrance. Nothing is imaged in frame F81 on the left side in FIG. 21. A roadside tree is imaged in frame 82 as shown in the center in FIG. 21, after a time α from frame F81. Further, the roadside tree is not imaged in frame 83 as shown on the right side in FIG. 21, after the time α.

FIG. 22 shows a change of the image when the direction of the imaging unit of the obtaining unit 31 is changed to the left at a low speed, due to a hindrance. A roadside tree is imaged in frame F91 on the left side in FIG. 22, slightly on the left from the center on the screen. As shown in the center of FIG. 22, in frame F92, after a time a from frame F91, the roadside tree is imaged approximately in the center of the screen. Further, as shown on the right side of FIG. 22, in frame F93 after the time α, the roadside tree is imaged slightly on the right from the center of the screen.

As shown in FIG. 21, when the direction of the imaging unit of the obtaining unit 31 is changed to the left at a fast speed due to a hindrance, it is possible to detect the hindrance, by comparing frame 82 to frame 81 when updating frame 82, and by comparing frame 83 to frame 82 when updating frame 83. However, it is not possible to detect the change of the image by comparing frame 83 to frame 81, for example, when making the updating gap long and updating frame 83.

In contrast, as shown in FIG. 22, when the speed of the hindrance is slow, it is not possible to detect the change of the image even if frame 92 is compared to frame 91, when updating frame 92. Similarly, it is not possible to detect the change of the image even if frame 93 is compared to frame 92, when updating frame 93, and it is not possible to detect the change of the image even if frame 93 is compared to frame 91. That is, it is not possible to detect the change of the image if the position of the roadside tree is not further moved to the right, and at least a part of the tree is not moved to the outside from the screen. That is, the updating gap should be long, in order to detect a slow hindrance.

In this manner, it is necessary to make the updating gap short in order to detect a fast hindrance when updating the entire frame, and inversely, it is necessary to make the updating gap long in order to detect a slow hindrance, as a result, it is difficult to detect both hindrances. In this regard, as shown in FIGS. 19 and 20, since the block is updated in units according to the embodiment of the disclosure, it is possible to detect both a fast hindrance and a slow hindrance.

[Sequence of Movement of Blocks]

Figure 23:
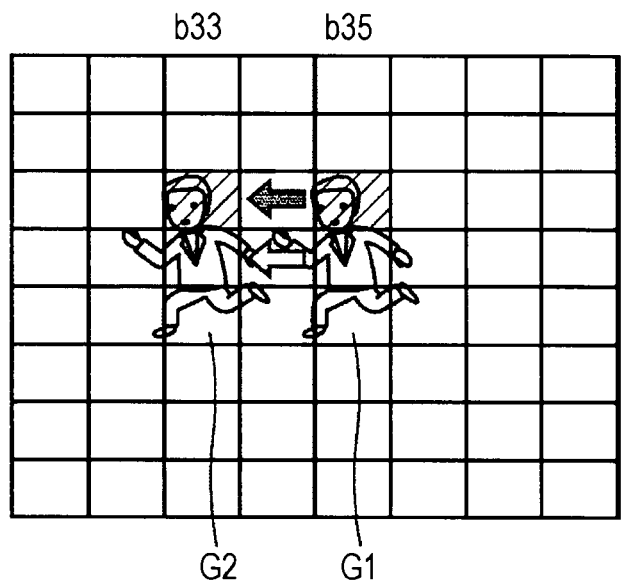
FIG. 23 is a diagram which describes a relationship between movement of a moving body and blocks.

FIG. 23 is a diagram which describes the relationship between the movement of the moving body and the movement of the blocks. As shown in FIG. 23, the block to be updated is assumed to usually move from the right to the left. In this case, when the moving body G in the screen is moved from the right to the left, the moving body G1 which is detected in the block b35 is detected as the moving body G2 in the block b33 as well. As a result, false detection occurs, as there is a change of the image based on the hindrance. Accordingly, it is preferable that the direction of the change of the position on the screen of at least the two blocks to be updated, be designated to a different direction, such as the right direction and the left direction, for example, as shown in FIG. 18. Further, it is possible to change the direction randomly.

Figure 24:
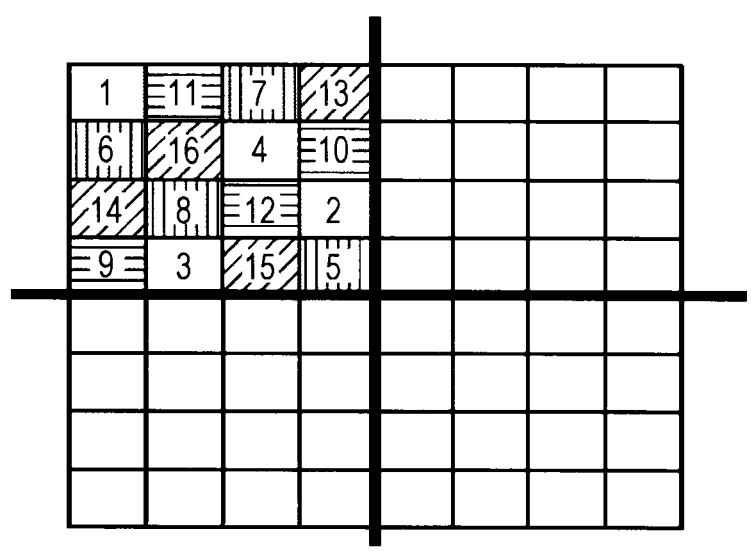
FIG. 24 is a diagram which shows a movement sequence of blocks to be updated.

FIG. 24 is a diagram which shows the moving sequence of the block to be updated. In this embodiment, similarly to the embodiment shown in FIGS. 16 and 18, the blocks of 8×8 are divided into 4 blocks of 4×4 blocks as well. In addition, one block is selected from each group, and 4 blocks are selected as the blocks to be updated in total. That is, the blocks are divided into 4 groups of blocks of the upper left, the upper right, the left below, and the right below, which are formed of 4×4 blocks. In addition, one block is selected as the block to be updated from each group, and 4 blocks are set as the blocks to be updated at one time. However, the rule of selecting one block in each group is different from that of the embodiment shown in FIGS. 16 and 18.

In the embodiment shown in FIG. 24, in each group a predetermined block among 4×4 blocks is selected as the block to be sequentially updated, according to the following rules. The rules will be described on the basis of the block in the upper left group in FIG. 24. The blocks to be updated in the other groups will be selected, according to the same rules.

Firstly, the 4×4 blocks are divided into 4 sub-groups according to the following rules.

Rule 1: Each sub-group has one block in the corner among the 4×4 blocks.

Rule 2: In the same sub-group the x and y coordinates of each group do not overlap each other.

Rule 3: Only one pair of blocks among the blocks of each sub-group are close to each other in the oblique direction.

In FIG. 24, the sub-group is denoted with patterns. The blocks with the same pattern are the blocks which belong to the same sub-group. In the example shown in FIG. 24, the blocks with Nos. 1 to 4 configure a first group, the blocks with Nos. 5 to 8 configure a second group. Further, the blocks with Nos. 9 to 12 configure a third group, and the blocks with Nos. 13 to 16 configure a fourth group.

In the example shown in FIG. 24, on the basis of rule 1, the first to the fourth sub-groups have respective blocks at the corner of Nos. 1, 5, 9, and 13. On the basis of rule 2, the blocks from each different sub-group are arranged one by one in each row of the 4×4 blocks. In addition, also in each column, the blocks from each different sub-group are arranged one by one. On the basis of rule 3, the blocks of Nos. 2 and 4 in the first group, the blocks of Nos. 6 and 8 in the second group, the blocks of Nos. 10 and 12 in the third group, and the blocks of Nos. 14 and 16 in the fourth group, are close to each other in the oblique direction. In this manner, it is possible to make the shortest distance in the same sub-group be long. That is, it is possible to make the blocks in the same sub-group be separated from each other.

Rule 4: The blocks with the smallest number in each sub-group are positioned on the diagonal line of the 4×4 blocks.

In the example in FIG. 24, the blocks with the smallest numbers 1, 5, 9, and 13 of the first sub-group to the fourth sub-group, are arranged on the diagonal line.

The updating order of the blocks in the same sub-group follow the following rules.

Rule 5: The smallest number is allocated to the block at the corner of the 4×4 blocks.

Rule 6: The subsequent number is allocated to the block of which position on the x-coordinate is farthest from the block of which the number is determined in rule 5.

Rule 7: The further subsequent number is allocated to the block of which the position of the x-coordinate is farthest from the block of which number is determined in rule 6, among the remaining two blocks.

Rule 8: The subsequent number is allocated to the block which finally remains.

In the example shown in FIG. 24, on the basis of rule 5, the smallest number 1 is allocated to the block which is positioned at the corner, among the numbers 1 to 4, in the first sub-group. Similarly, the smallest number 5 is allocated to the block which is positioned at the corner, among the numbers 5 to 8, in the second sub-group. The smallest number 9 is allocated to the block which is positioned at the corner, among the numbers 9 to 12, in the third sub-group. The smallest number 13 is allocated to the block which is positioned at the corner, among the numbers 13 to 16, in the fourth sub-group.

In the example shown in FIG. 24, on the basis of rule 6, the subsequent number 2 is allocated to the block of which the position of the x-coordinate is farthest from the block of number 1, in the first sub-group. Similarly, the subsequent number 6 is allocated to the block of which the position of the x-coordinate is farthest from the block of number 5, in the second sub-group. The subsequent number 10 is allocated to the block of which the position of the x-coordinate is farthest from the block of number 9, in the third sub-group. The subsequent number 14 is allocated to the block of which the position of the x-coordinate is farthest from the block of number 13, in the fourth sub-group.

In the example shown in FIG. 24, on the basis of rule 7, the further subsequent number 3 is allocated to the block of which the position of the x-coordinate is farthest from the block of number 2 which is determined in rule 6, among the remaining two blocks, in the first sub-group. The further subsequent number 7 is allocated to the block of which the position of the x-coordinate is farthest from the block of number 6 which is determined in rule 6, among the remaining two blocks, in the second sub-group. The further subsequent number 11 is allocated to the block of which the position of the x-coordinate is farthest from the block of number 10 which is determined in rule 6, among the remaining two blocks, in the third sub-group. The further subsequent number 15 is allocated to the block of which the position of the x-coordinate is farthest from the block of number 14 which is determined in rule 6, among the remaining two blocks, in the fourth sub-group.

In the example shown in FIG. 24, on the basis of rule 8, the subsequent number 4 is allocated to the finally remaining block, in the first sub-group. The subsequent number 8 is allocated to the finally remained block, in the second sub-group. The subsequent number 12 is allocated to the finally remained block, in the third sub-group. The subsequent number 16 is allocated to the finally remained block, in the fourth sub-group.

As described above, the numbers 1 to 16 which are attached to each group in the upper left in FIG. 24, are determined on the basis of the rules, and each block is updated according to the order of the numbers. A predetermined group of the 4 sub-groups is selected in the order, and a predetermined block of the 4 blocks is selected in the order in the selected sub-group. In this manner, it is possible to suppress the occurrence of a false detection. In addition, in these rules, the order is determined such that the x-coordinate of each block, that is, the block of which the coordinate in the horizontal direction is separated as far as possible, is firstly selected. Accordingly, it is possible to suppress a false detection due to the moving body which is moving in the horizontal direction, particularly.

It is possible to suppress a false detection due to the moving body which is moving in the vertical direction, if the order is determined such that the y-coordinate of each block, that is, the block of which the coordinate in the vertical direction is separated as far as possible, is firstly selected.

[Shape of Block]

In the embodiment shown in FIG. 16, the block has a horizontally long shape, and is moved in the longitudinal direction, that is the horizontal direction. The shape of the block can be made to have a long shape in the direction which is perpendicular to the movement direction. In other words, the block can be moved in the direction which is perpendicular to the longitudinal direction thereof.

Figure 25:
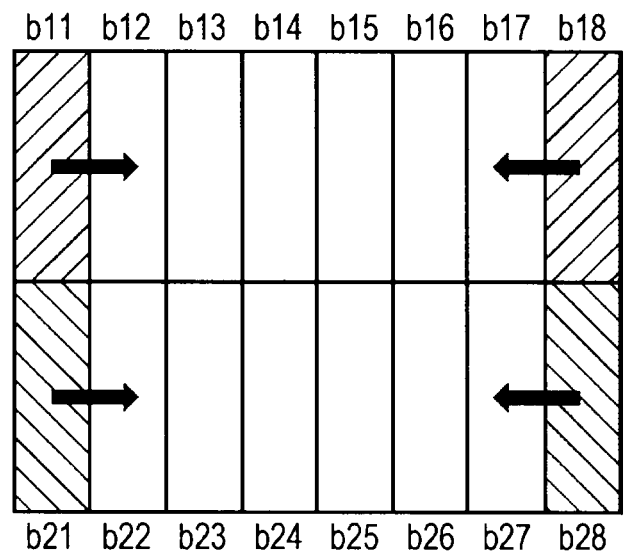
FIG. 25 is a diagram which shows a shape of blocks.

FIG. 25 is a diagram which shows the shape of the block. In FIG. 25, the screen is divided into the upper half and the lower half, and each of the blocks is divided into 8 blocks of b11 to b18, and b21 to b28. As a result, each block has a vertically long shape. In addition, the moving direction of the block at the time of updating, is set to the direction which is perpendicular to the longitudinal direction, that is, the horizontal direction. For example, when the hindrance is limited to the horizontal direction since the imaging unit is able to be moved only in the horizontal direction, only the movement in the horizontal direction is detected. Therefore, as shown in FIG. 25, it is possible to make a shape of a block of which the vertical side is longer than the side which is parallel to the direction of the change.

Figure 26:
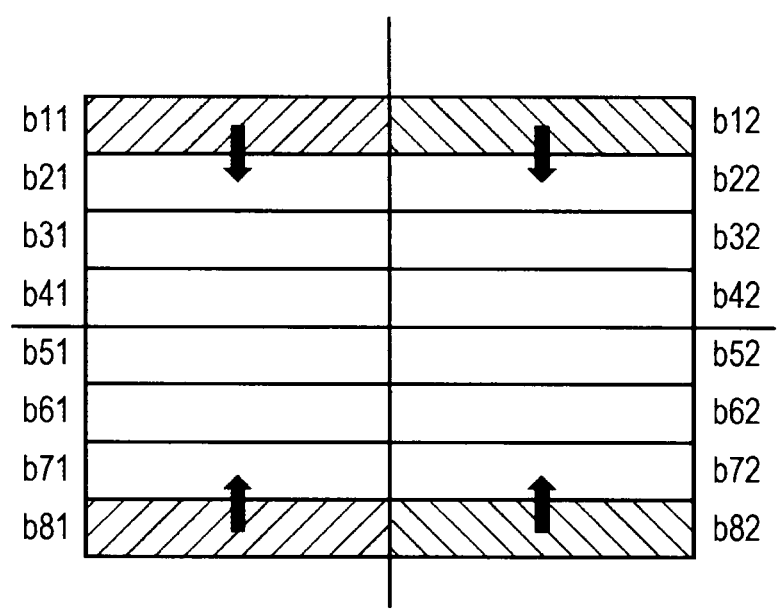
FIG. 26 is a diagram which shows a shape of the blocks.

FIG. 26 is a diagram which shows a shape of the block. In FIG. 26, the screen is divided into the left half and the right half, and each of the blocks is divided into 8 blocks of b11 to b81, and b12 to b82. As a result, each block has a horizontally long shape. In addition, the moving direction of the block at the time of updating is set to the direction which is perpendicular to the longitudinal direction, that is, the vertical direction. For example, when the hindrance is limited to the vertical direction since the imaging unit is able to be moved only in the vertical direction, only the movement in the vertical direction may be detected. Therefore, as shown in FIG. 26, it is possible to make a shape of a block of which the vertical side is longer than the side which is parallel to the direction of the change.

[Applying the Embodiments of the Disclosure to Program]

The above described series of processing can be performed using hardware, or software.

When the series of processing is performed using software, the program which constitutes the software is installed to a computer which is embedded in the dedicated hardware, a computer which can execute various functions by being installed with various programs, for example, a general-purpose personal computer, or the like, through a network or a recording medium.

The recording medium which includes such a program is not only configured by a magnetic disk (including a floppy disk) in which a program distributed to provide the program to a user, is recorded, an optical disc (including a CD-ROM (Compact Disc-Read Only Memory), and a DVD), a magneto-optical disc (including MD (Mini-Disc)), a semi-conductor memory, or the like, but also by a flash ROM, a hard disk, or the like, in which a program is recorded, and is provided to the user in a state where the program is inserted into a main body of the apparatus in advance.

In addition, in this specification, description of the program which is recorded in the recording medium may include processing which is performed in time series according to the order, and also includes processing which is performed in parallel or individually, not necessarily being processed in time series.

The present disclosure contains subject matter related to that disclosed in Japanese Priority Patent Application JP 2010-278897 filed in the Japan Patent Office on Dec. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
an obtaining unit which obtains image data of an image;
a dividing unit which divides the obtained image into N blocks (N>1);
a designation unit which sequentially designates M blocks (N≧M>1) among the N blocks as blocks to be updated, every time the image data of the image which is new is obtained;
a histogram generation unit which generates a histogram of the designated M blocks of the image data;
a histogram storage unit which sequentially updates and stores the generated histogram;
a change determination unit which determines a change in the obtained image, on the basis of the degree of similarity between the histogram of the generated M blocks and the histogram of the M blocks in the past corresponding to the generated M blocks which are stored;
a normalization determination unit which determines whether or not to perform normalization of the histogram; and
a normalization unit which normalizes any one of the histogram of the generated M blocks and the histogram of the corresponding M blocks in the past which are stored, when the normalization is determined in the normalization determination unit, wherein the change determination unit determines the change in the obtained image, on the basis of the degree of similarity using the histogram after the normalization, when the normalization of the histogram is performed, using the normalization unit.

2. The image processing device according to claim 1, further comprising:
a normalization value calculating unit which calculates a normalization value which is used to normalize the histogram, when it is determined to perform the normalization in the normalization determining unit,
wherein the normalization unit normalizes any one of the histogram of the generated M blocks, and the histogram of the M blocks in the past corresponding to the generated M blocks which are stored, on the basis of the normalization value which is calculated using the normalization calculating unit.

3. The image processing device according to claim 2,
wherein the normalization determining unit compares the histogram of each of the generated M blocks to the histogram of the M blocks in the past corresponding to the generated M blocks which are stored, determines whether the direction of the change of the mean value of the histogram is an increase, a decrease, or no change, and determined to perform the normalization when the direction of the change of the mean value of the histogram in the entire screen is inclined to any of an increase and a decrease over a certain value.

4. The image processing device according to claim 3,
wherein the normalization calculating unit determines an area which corresponds to the direction of the change of the mean value of the histogram in the entire screen, as the effective area, and calculates the mean value of the changing rate of the mean value of the histogram of each block which is set as the effective area, as the normalization value.

5. The image processing device according to claim 4, further comprising:
a mean value storage unit which stores the direction of the change and the changing rate of the mean value of the histogram of each of the M blocks, when the histogram of each of the M blocks which are generated, is compared to the histogram of each of the M blocks in the past corresponding to the generated M blocks which are stored.

6. The image processing device according to claim 2,
wherein the normalization unit normalizes any one of the histogram of the generated M blocks, or the histogram of the M blocks in the past corresponding to the generated M block, which are stored, by adjusting the frequency of the histogram so that the areas before and after the normalization are identical to each other, after being stretched in the luminance direction, on the basis of the normalization value which is calculated using the normalization calculating unit.

7. An image processing method comprising:
obtaining image data of an image;
dividing the obtained image into N blocks (N>1);
sequentially designating the M blocks (N≧M>1) among the N blocks as the blocks to be updated, every time the image data of the image which is new is obtained;
generating a histogram of the obtained image data;
sequentially updating and storing the generated histogram;
determining a change in the obtained image, on the basis of the degree of similarity between the histogram of the generated M blocks and the histogram of the M blocks in the past corresponding to the generated M blocks which are stored;
determining normalization which determines whether or not to perform normalization of the histogram; and
normalizing any one of the histogram of the generated M blocks and the histogram of the corresponding M blocks in the past which are stored, when the normalization is determined in the normalization determination unit;
wherein the determining of the change determines the change in the obtained image, on the basis of the degree of similarity using the histogram after the normalization, when the normalization of the histogram is performed using the normalizing.

8. A non-transitory computer readable medium that stores a program which enables a computer to execute processes comprising:
obtaining image data of an image;
dividing the obtained image into N blocks (N>1);
sequentially designating M blocks (N≧M>1) among the N blocks as the blocks to be updated, every time the image data of the image which is new is obtained;
generating a histogram of the obtained image data;
sequentially updating and storing the generated histogram;
determining a change in the obtained image, on the basis of the degree of similarity between the histogram of the generated M blocks and the histogram of the M blocks in the past corresponding to the generated M blocks which are stored;
determining normalization which determines whether or not to perform normalization of the histogram; and
normalizing any one of the histogram of the generated M blocks and the histogram of the corresponding M blocks in the past, which are stored, when the normalization is determined in the normalization determination unit;

wherein the determining of the change determines a change in the obtained image, on the basis of the degree of similarity using the histogram after the normalization, when the normalization of the histogram is performed using the normalizing.

* * * * *